US012632252B2

(12) United States Patent
Lee et al.

(10) Patent No.: US 12,632,252 B2
(45) Date of Patent: May 19, 2026

(54) MEMORY DEVICE AND METHOD WITH PROCESSING-IN-MEMORY BLOCK

(71) Applicant: SAMSUNG ELECTRONICS CO., LTD., Suwon-si (KR)

(72) Inventors: Sunjung Lee, Suwon-si (KR); Yoonah Paik, Suwon-si (KR); Sanghoon Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/814,641

(22) Filed: Aug. 26, 2024

(65) Prior Publication Data

US 2025/0130795 A1     Apr. 24, 2025

(51) Int. Cl.
*G06F 9/30*             (2018.01)

(52) U.S. Cl.
CPC ........ *G06F 9/3001* (2013.01); *G06F 9/30036* (2013.01); *G06F 9/30101* (2013.01)

(58) Field of Classification Search
CPC .............................. G06F 9/3001; G06N 3/063
See application file for complete search history.

(56) References Cited

U.S. PATENT DOCUMENTS

2018/0307985 A1* 10/2018 Appu ................... G05D 1/0088
2019/0042252 A1*  2/2019 Kaul ..................... G06F 7/5443

2020/0371793 A1   11/2020 Bhardwaj et al.
2021/0224069 A1*   7/2021 Chen ...................... G06F 9/3001
2022/0107803 A1    4/2022 Ro et al.
2022/0113975 A1*   4/2022 Lucia .................... G06F 9/3838
2022/0180467 A1*   6/2022 Koker ................ G06F 12/0862
2022/0309124 A1*   9/2022 Mei ..................... G06F 15/8046
2023/0077933 A1    3/2023 Kalamatianos et al.
2023/0236836 A1    7/2023 Lee et al.
2023/0244492 A1    8/2023 Kotra et al.

FOREIGN PATENT DOCUMENTS

KR     10-2019-0026830 A     3/2019
KR     10-2020-0025200 A     3/2020
KR     10-2022-0107617 A     8/2022
KR     10-2022-0121657 A     9/2022

OTHER PUBLICATIONS

European Extended Search Report dated Mar. 28, 2025 for the corresponding EP Patent Application No. 24206889.8, 9 pages.

(Continued)

*Primary Examiner* — Michael J Metzger
(74) *Attorney, Agent, or Firm* — F. CHAU & ASSOCIATES, LLC

(57) ABSTRACT

A memory device includes a first scalar register file storing a first input fragment, a second scalar register file storing a second input fragment, an arithmetic logic unit (ALU), and a control circuit. The control circuit is configured to perform, using the ALU, a first operation between the first input fragment and a first weight fragment based on a first operation command received from a host, and to perform, using the ALU, a second operation between the second input fragment and a second weight fragment based on a second operation command received from the host.

20 Claims, 22 Drawing Sheets

(56) References Cited

OTHER PUBLICATIONS

Kim, et al., "Aquabolt-XL HBM2-PIM, LPDDR5-PIM With In-Memory Processing, and AXDIMM With Acceleration Buffer", Theme Article: Hot Chips 33, IEEE Micro, May/Jun. 2022, 11 pages.

Lee, et al., "Hardware Architecture and Software Stack for PIM Based on Commercial DRAM Technology", in ACM/IEEE 48th Annual International Symposium on Computer Architecture (ISCA), 2021, DOI: 10.1109/ISCA52012.2021.00013, pp. 43-56.

Office Action dated Dec. 11, 2024 for the corresponding KR Patent Application No. 10-2023-0142326, in Korean, 7 pages.

Office Action dated Dec. 11, 2024 for the corresponding KR Patent Application No. 10-2023-0142326, with English Translation, 4 pages.

* cited by examiner

FIG. 2

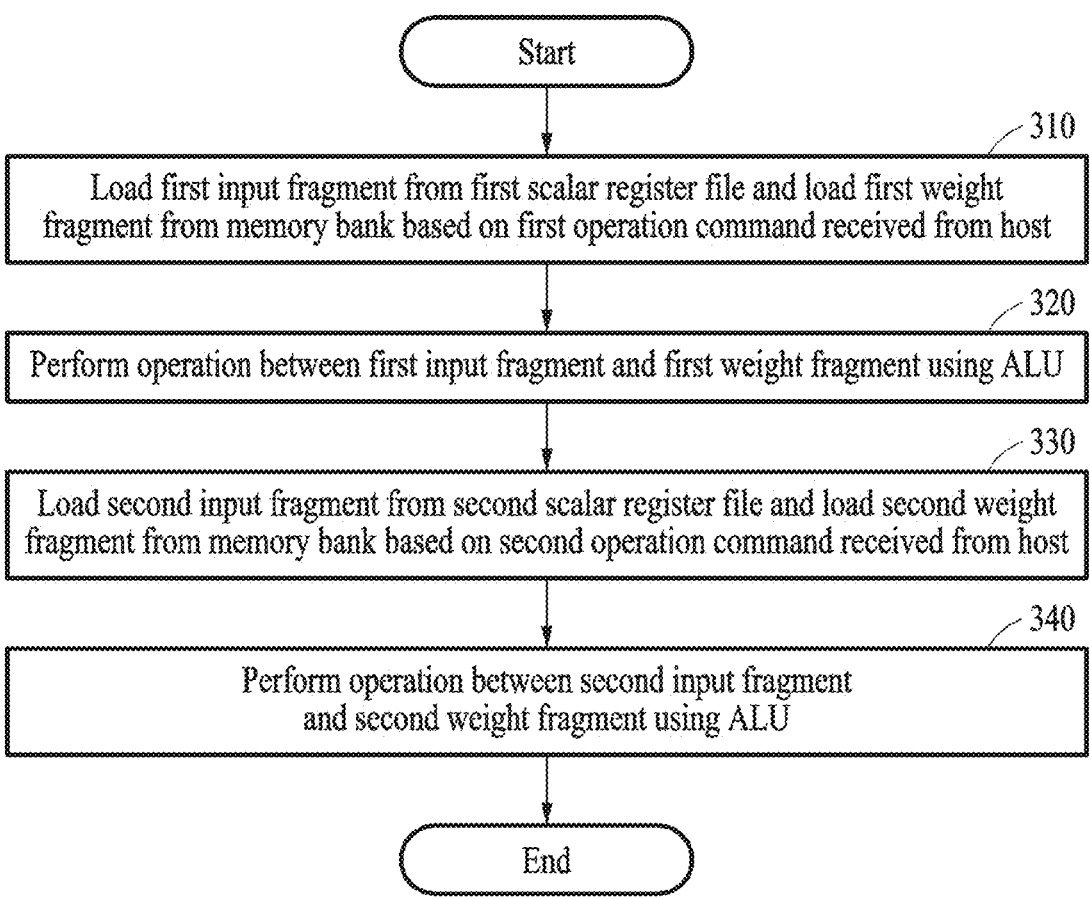

Start

310

Load first input fragment from first scalar register file and load first weight fragment from memory bank based on first operation command received from host

320

Perform operation between first input fragment and first weight fragment using ALU

330

Load second input fragment from second scalar register file and load second weight fragment from memory bank based on second operation command received from host

340

Perform operation between second input fragment and second weight fragment using ALU End

FIG. 3

MEMORY DEVICE AND METHOD WITH PROCESSING-IN-MEMORY BLOCK

CROSS-REFERENCE TO RELATED APPLICATION

This application claims priority to Korean Patent Application No. 10-2023-0142326, filed on Oct. 23, 2023, in the Korean Intellectual Property Office, the entire disclosure of which is incorporated by reference herein for all purposes.

BACKGROUND

The following description relates to a memory device and method with a processing-in-memory (PIM) block.

Efficient and high-performance neural network processing is important for devices such as computers, smartphones, tablets, and wearable devices. In some cases, as processing performance increases with a decrease in power consumption of a device, a specialized hardware accelerator for performing a specialized task may be implemented for the device. For example, various hardware accelerators may be interconnected to generate a computational graph for applications in natural language processing (NLP), language translation, and text generation. In such configurations, a subsystem dedicated to accelerating NLP, language translation, and text generation can be established, including a network of specialized hardware accelerators. In these examples, a near-memory accelerator may refer to an accelerator implemented by a hardware accelerator near a memory, and in-memory computing may refer to hardware acceleration implemented in a memory.

SUMMARY

According to embodiments of the present disclosure, a memory device includes a first scalar register file storing a first input fragment, a second scalar register file storing a second input fragment, an arithmetic logic unit (ALU), and a control circuit. The control circuit is configured to perform, using the ALU, a first operation between the first input fragment and a first weight fragment based on a first operation command received from a host, and to perform, using the ALU, a second operation between the second input fragment and a second weight fragment based on a second operation command received from the host.

According to embodiments of the present disclosure, an operation method performed by a memory device includes loading a first input fragment from a first scalar register file and loading a first weight fragment from a memory bank based on a first operation command received from a host, performing a first operation between the first input fragment and the first weight fragment using an ALU, loading a second input fragment from a second scalar register file and loading a second weight fragment from the memory bank based on a second operation command received from the host; and performing, using the ALU, a second operation between the second input fragment and the second weight fragment.

According to embodiments of the present disclosure, a computing system includes a host configured to transmit operation commands indicating weight fragments of different memory rows in a same memory bank without time corresponding to a fence, and a memory device configured to load from a plurality of scalar register files different input fragments corresponding to the operation commands, and perform operations, using an ALU, between the weight fragments and the input fragments.

According to embodiments of the present disclosure, a method of performing a processor-in-memory (PIM) operation includes generating a scalar register file index and a vector register file index, loading an input value from the scalar register file based on the scalar register file index, performing an operation on the input value and a weight value from a memory bank, and storing a result of the operation in the vector register file based on the vector register file index. The scalar register file index indicates a scalar register file from among a plurality of scalar register files and the vector register file index indicates a vector register file from among a plurality of vector register files.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2 illustrates a processing-in-memory (PIM) block of a memory device according to an embodiment.

FIGS. 3 and 4 illustrate an operation method in a memory device according to an embodiment.

DETAILED DESCRIPTION

Figure 1:
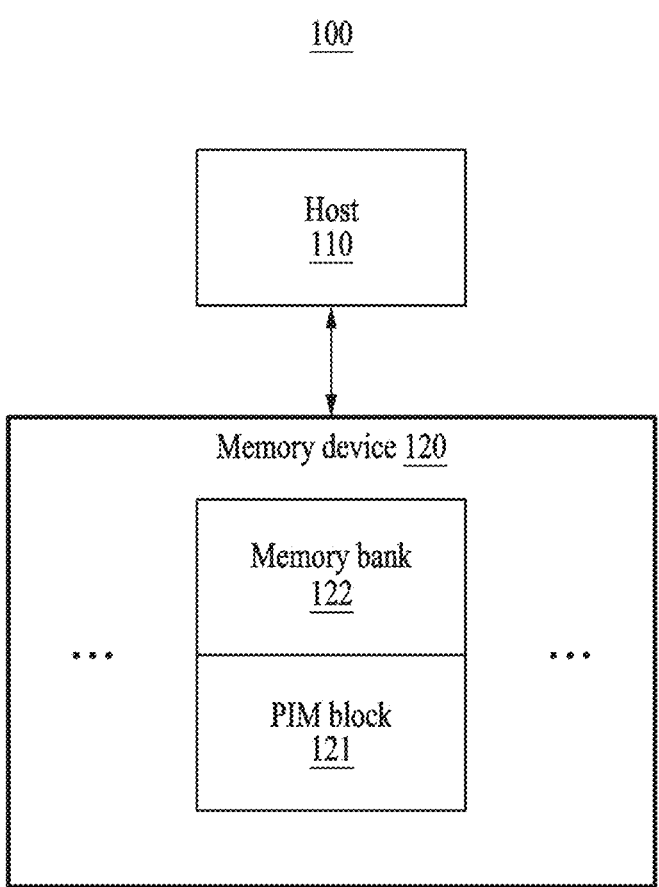
FIG. 1 illustrates a computing system according to an embodiment.

The following detailed structural or functional description is provided as examples. Various alterations and modifications may be made to the examples. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, or similarly, the second component may be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, the embodiments will be described in detail with reference to the accompanying drawings. When describing the embodiments with reference to the accompanying drawings, like reference numerals refer to like components and a repeated description related thereto will be omitted.

FIG. 1 illustrates a computing system according to an embodiment.

A computing system 100 according to an embodiment may include a host 110 and a memory device 120.

The host 110 is a management entity of a computer system (e.g., an electronic device) and may be implemented as a host processor or as a server. The host processor may include, for example, a host central processing unit (CPU). For example, the host processor may include a processor core and a memory controller. The memory controller may control the memory device 120. The host processor may process data. For example, the data may be received from the memory device 120 through the memory controller using a processor core. In some embodiments, the memory controller may transmit a command to the memory device 120. Examples of a write command and an operation command can be described as commands transmitted to the memory device 120. For example, a write command may be a command indicating a register file of the memory device 120 to write an input value for a target operation (e.g., a multiply and accumulate (MAC) operation). The operation command may instruct a matrix product operation, such as a General Matrix Vector Multiplication (GEMV) operation. This operation involves processing a segment of a partial weight matrix, or alternatively, a weight vector, in conjunction with an input vector. In some embodiments, a processing-in-memory (PIM) block 121 of the memory device 120 may perform a product operation (multiplication operation)

between an input value and a weight value and an addition operation of partial operation results based on the operation command.

PIM refers to a block within a memory device that enables data processing directly within the memory architecture, thus reducing the need to move data between the memory and a separate processing unit. The PIM block may be used to reduce power consumption and increase efficiency of data processing. The PIM block may include components like a control circuit, a bank interface, an ALU (Arithmetic Logic Unit), and register files.

The ALU performs arithmetic and logical operations required in the processing of data. This includes basic arithmetic operations like addition and subtraction, as well as logical operations such as exclusive OR, AND, and OR. For example, the ALU executes computational tasks within the system and operates under the control of a control device.

The operation command may be a dynamic random-access memory (DRAM) command provided to the memory device 120 set in a PIM all-bank mode. A DRAM RD command of the DRAM command may correspond to an operation command and a DRAM WR command may correspond to a write command. Each operation command may include information (e.g., address information) indicating an internal address of the memory device 120.

The memory device 120 includes a designated memory area for data storage. The memory area may facilitate both reading from and writing data to the memory device 120. The memory area may be a physical region within the memory chip, In some embodiments, the memory area may be disposed in a memory die (or a core die) of the memory device 120. The memory device 120 may process data from the memory area in cooperation with the host processor. For example, the memory device 120 may execute data operations or processing tasks based on a command or an instruction received from the host processor. The memory device 120 may control the memory area in response to the command or the instruction of the host processor. The memory device 120 may be separated from the host processor. For example, the host processor may oversee one or more operations and delegate specific operations that benefit from acceleration, such as PIM operations, to the memory device 120.

The memory device 120 may include the PIM block 121 and a memory (e.g., a plurality of memory banks 122). For example, the memory device 120 may perform a target operation using data stored in the memory through a plurality of PIM blocks 121. The target operation may be, for example, a GEMV operation. For example, input data and output data of the GEMV operation may be data in the form of a vector, and weight data may be data in the form of a matrix. Since the weight data has a capacity (e.g., a memory size) larger than a cache size of the host 110, the weight data may be stored in the memory device 120 (e.g., a DRAM device). As will be described in more detail based on FIG. 5, the GEMV operation may be, for example, an operation between a weight matrix and an input vector (e.g., a matrix-vector product operation). For example, the input vector may be divided into a plurality of partial input vectors, and each partial input vector may include a plurality of input fragments (e.g., scalar values).

A memory may store data. The plurality of memory banks 122 may be generated using one or more memory chips of the memory device 120. Each memory bank 122 of the plurality of memory banks 122 may store a selection of values, such as weight fragments, In some examples, the weight fragments are parts of the full weight matrix and are utilized in the target operation. For example, a weight fragment may be data in the form of a vector. For example, the target operation may be decomposed into a plurality of partial operations, and each memory bank may store some data to be included in the partial operations. For example, the GEMV operation may be decomposed into a plurality of MAC operations. The memory device 120 and/or the host 110 may divide a weight matrix of a target GEMV operation into partial weight matrices and store them in the plurality of memory banks 122. Each memory bank may include a plurality of storage cells that store values in a memory array disposed on a memory die of the memory device 120. The plurality of storage cells may be arranged along a row line and a column line. A portion including storage cells arranged along an arbitrary row line in the memory bank may be referred to as a memory row. The memory row may be a group of storage cells arranged along the same row line. Similarly, a memory column may be a group of storage cells arranged along the same column line.

The PIM block 121 may execute data operations or processing tasks using data stored in a memory according to the operation command. Each PIM block 121 may perform some operations of the plurality of partial operations included in the target operation (e.g., the GEMV operation). For example, the PIM block 121 may access a memory bank disposed adjacent to the PIM block 121 itself among the plurality of memory banks 122 of the memory device 120. The PIM block 121 may obtain data of a portion of an accessible memory bank corresponding to the operation command. The PIM block 121 may perform a partial operation using the obtained data. For example, the PIM block 121 may perform a partial operation that uses a weight fragment corresponding to the operation command in a partial weight matrix stored in a bank that the PIM block 121 is able to access. The weight fragment may be, for example, data including weights in the form of a vector. The PIM block 121 may retrieve a weight fragment and an input fragment as specified by the operation command and then perform either a multiplication, an addition, or both operations using the retrieved data. In some embodiments, the input fragment may be a scalar value.

FIG. 1 shows an example in which the PIM block 121 is allocated to a memory bank in a core die, but embodiments are not limited thereto. The PIM block 121 may be disposed adjacent to the plurality of memory banks 122 (e.g., two memory banks) and the PIM block 121 can access the plurality of memory banks. The PIM block 121 may determine the number of MAC units to be used for a partial operation based on a size of a weight fragment corresponding to one operation command (e.g., the number of weight values included in the weight fragment). The PIM block 121 may form a determined number of MAC units using a combination of a plurality of arithmetic and logical units (ALUs) (e.g., multipliers and adders). In some embodiments, the PIM block 121 may load a weight fragment from a memory bank, and load an input fragment from a register file (e.g., a scalar register file (SRF)). SRF is part of the memory architecture and may be used to hold data in a scalar form. Data in a scalar form has individual or singular data values. For example, SRF may be used for storing scalar values or input fragments. For example, an SRF might store different fragments of input data, with each scalar register file capable of storing multiple such fragments. The PIM block 121 may execute data operations or processing tasks between the loaded weight fragments and an input fragment using the MAC units described above.

Instructions may include instructions to execute operations of a host processor, the memory device 120, or processors in various devices, and/or operations of each component of a processor. For example, instructions (or programs) executable by the host processor may be stored in another memory device 120, but the embodiments are not limited thereto. In some embodiments, the instruction may include a fence instruction. A fence instruction may be an instruction to execute an operation of deactivating the host 110 or resources during the time corresponding to a fence (e.g., fence time). For example, the fence instruction for a designated PIM block 121 may be an instruction to execute an operation of holding, waiting, and/or limiting the transmission of a command (e.g., a write command or an operation command) for the designated PIM block 121 from the host 110. In some embodiments, a fencing operation may be involved because of constraints such as the small size of a buffer, like a row buffer, in each memory bank, and restricted usage of certain memory addresses, including row addresses. The fencing operation consumes a long cycle, and a method and structure for reducing the fencing operation for the PIM block 121 will be described herein. For example, the host 110 may transmit operation commands indicating weight fragments of different memory rows in the same memory bank without the time corresponding to the fence.

The memory device 120 (e.g., a PIM device) including the PIM block 121 may execute data operations or processing tasks for acceleration of an application program (e.g., machine learning and big data) that requires a large memory bandwidth. The memory device 120 may perform operations by accessing the plurality of memory banks 122 in parallel through the plurality of PIM blocks 121. The memory device 120 may perform operations with an internal memory bandwidth that is 4 to 8 times higher than an external memory bandwidth. Accordingly, the memory device 120 may significantly reduce the execution time of an application program with memory-intensive characteristics. In some embodiments, since the memory device 120 moves data only between the PIM block 121 and the memory bank 122, power consumption may also be reduced.

Figure 2:
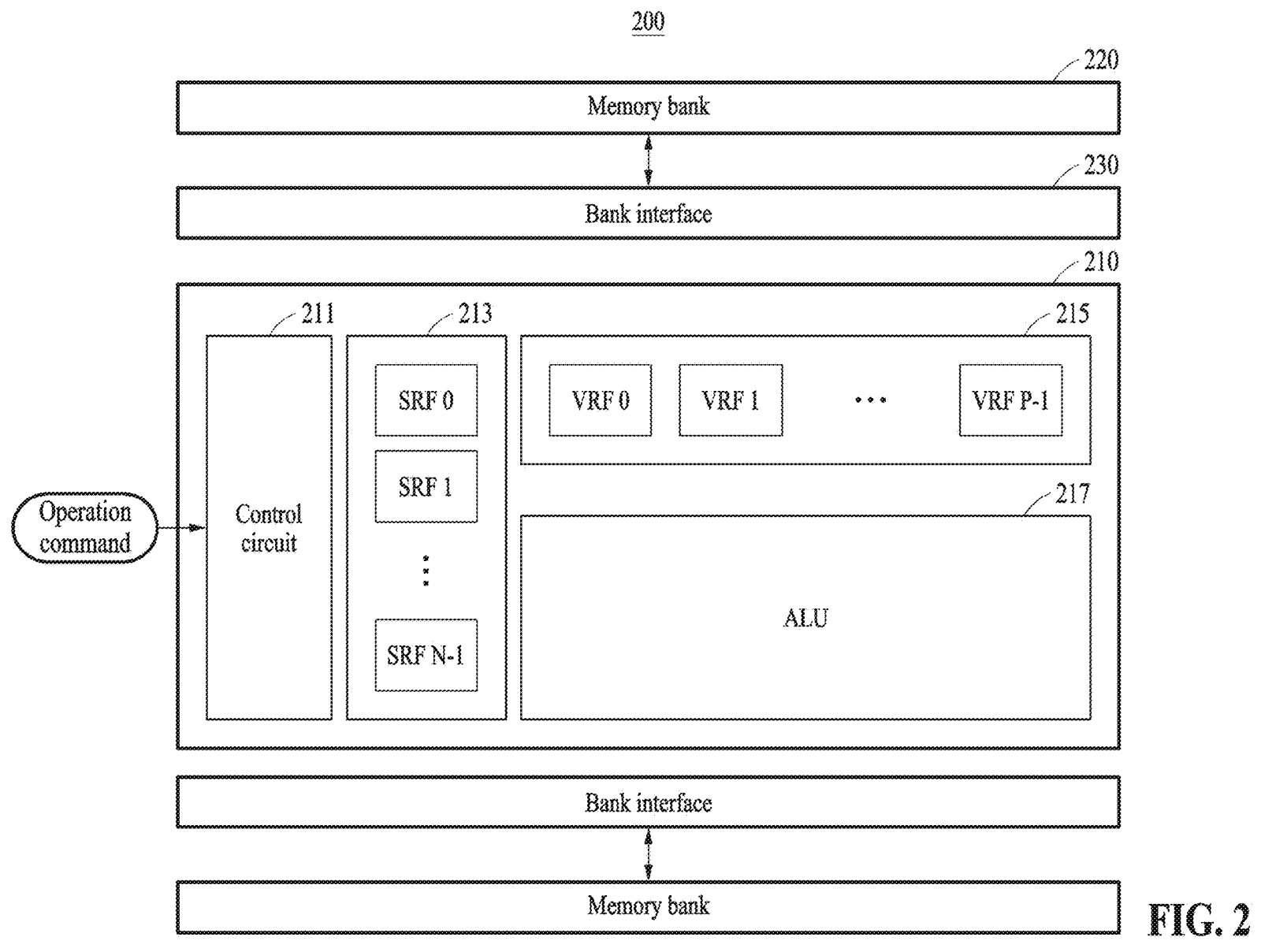

FIG. 2 illustrates a PIM block of a memory device according to an embodiment. A PIM block 210 may include a control circuit 211, a bank interface 230, an ALU 217, and register files. In some embodiments, the PIM block 210 may be disposed adjacent to a corresponding memory bank 220 among a plurality of memory banks of a memory device 200. The PIM block 210 may access the adjacent memory bank 220 through the bank interface 230. The memory bank 220 may store weight fragments. A weight fragment may be data in the form of a vector.

The control circuit 211 may receive an operation command for a partial operation from a host. In some embodiments, an operation command might contain address information that specifies a specific location within the memory bank 220 of the memory device 200, such as the row and column addresses, where a value, for example, a weight, is stored. Row address information is information indicating a memory row address and may include a number (e.g., a row index) of a memory row corresponding to a location in a memory array where a value is stored. Column address information is information indicating a memory column address and may include a number (e.g., a column index) of a memory column corresponding to a location in a memory array where a value is stored. The control circuit 211 may load values (e.g., the weight fragments) of memory addresses (e.g., DRAM addresses) indicated by the received operation command. Further, based on the received operation command, the control circuit 211 may identify a register file (e.g., a SRF) that stores an input fragment in the PIM block 210 and identify a register file (e.g., a vector register file (VRF)) that stores a result of a partial operation corresponding to an operation command. VRF may be used for storing vector values or results of partial operations. For example, when a series of operation commands indicate the same VRF, the VRF accumulates the outcomes of these operations, such as the results of arithmetic operations. According to some embodiments, a system may have multiple VRFs, each capable of storing results of these operations. The control circuit 211 may determine information, such as an index, identifying a specific register file among the register files that holds a value for use in a partial operation. This determination is based on the memory addresses, including both the memory row address and the memory column address, as specified by an operation command.

Figure 14:
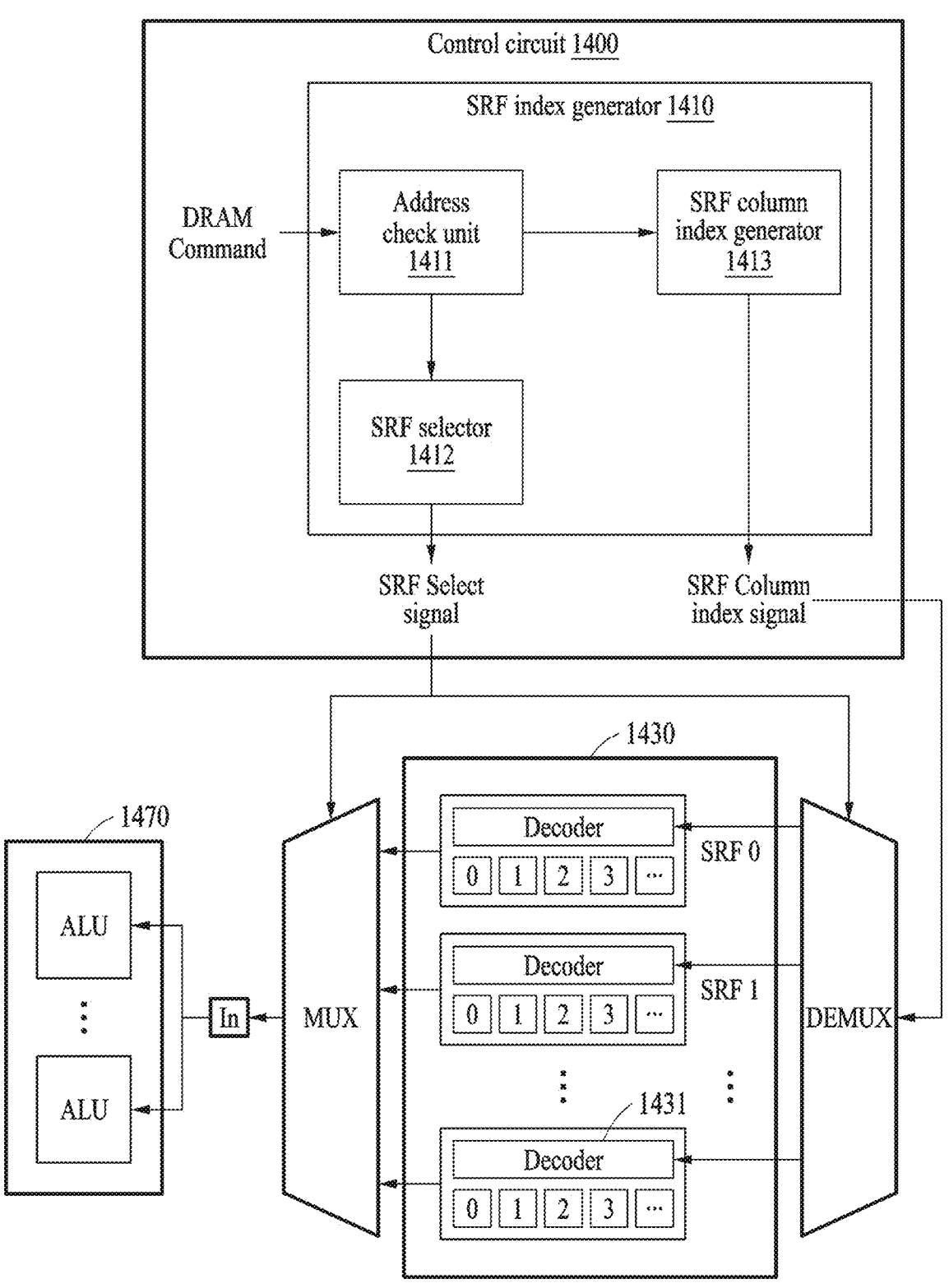
FIGS. 14 and 15 illustrate loading of an input fragment stored in a scalar register file according to an embodiment.
Figure 15:
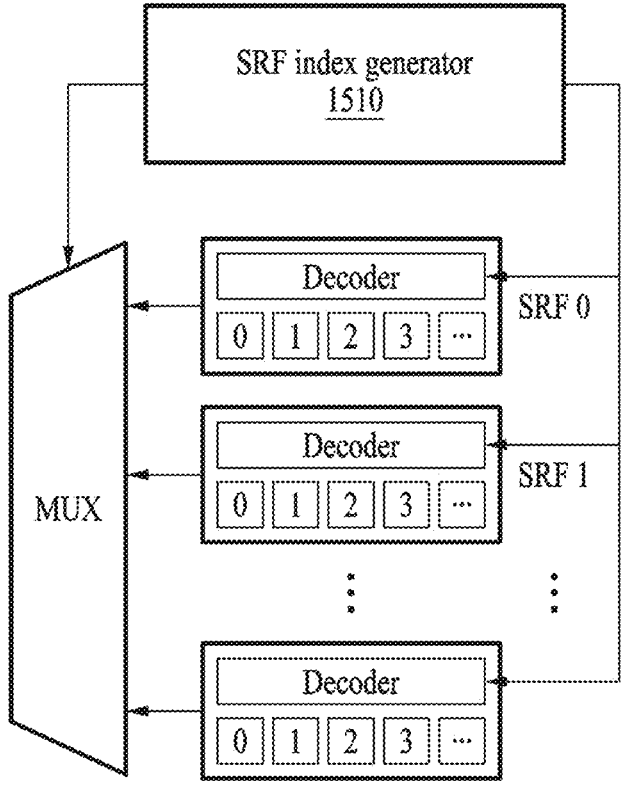
Figure 16:
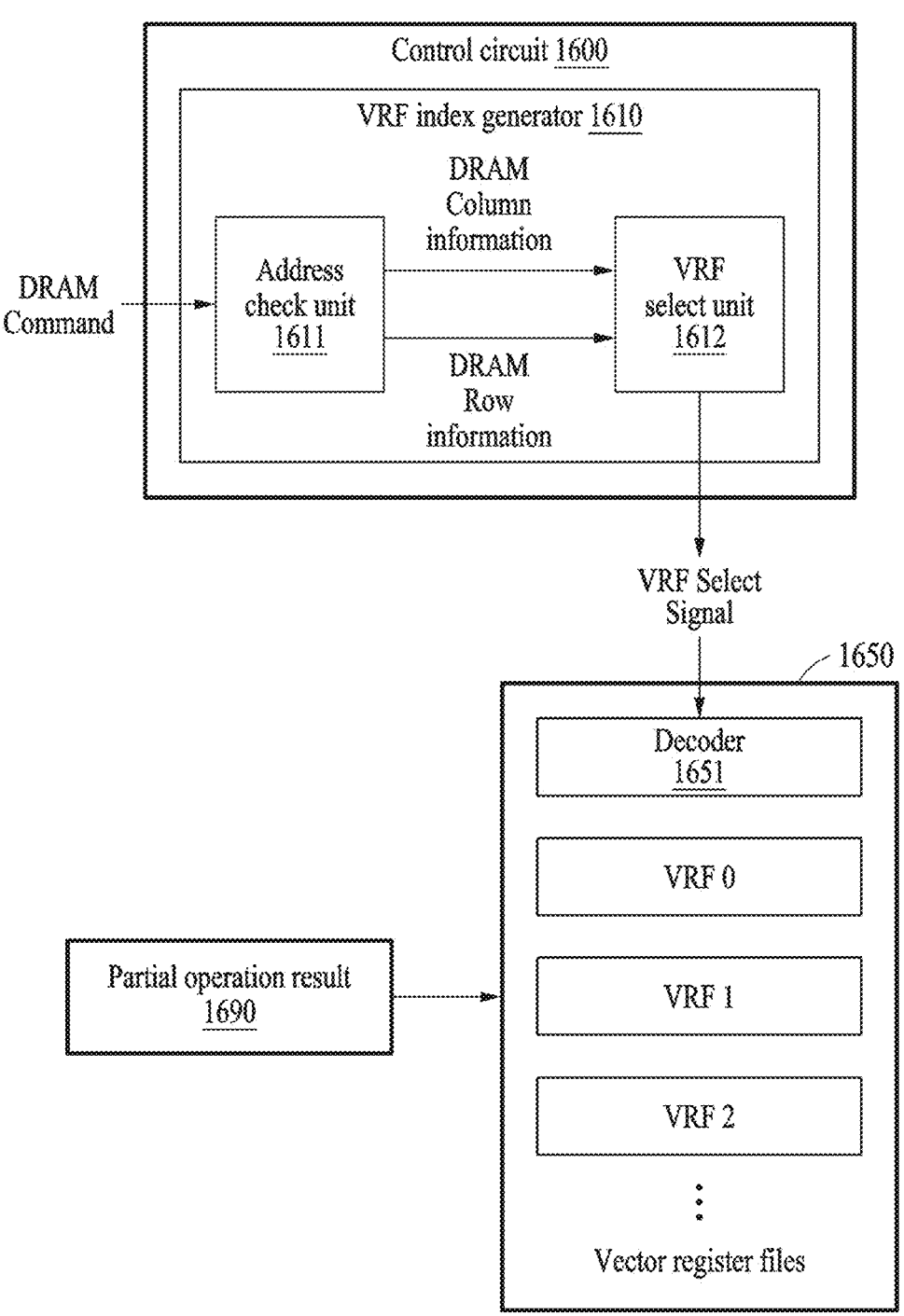
FIG. 16 illustrates selection of a vector register file according to an embodiment.

In some embodiments, the control circuit 211 may include a buffer (e.g., a flip-flop buffer) and a structure shown in FIGS. 14 to 16. An operation of selecting a register file to be included in a partial operation from an operation command will be described based on FIGS. 14 to 16 below.

The register files may be an element including a logic circuit (e.g., a digital logic circuit) that implements a storage function. The register files may include scalar register files 213 for storing scalar values and vector register files 215 for storing vector values.

The scalar register files 213 may store input fragments. For example, a first scalar register file SRF 0 may store a first input fragment. A second scalar register file SRF 1 may store a second input fragment. In some embodiments, an input fragment may be an input scalar value, and each scalar register file may store a plurality of input fragments. For example, an input vector included in the GEMV operation may include a plurality of partial input vectors, and each partial input vector may include a plurality of input fragments (e.g., input scalar values). FIG. 2 shows N scalar register files 213 (e.g., a first scalar register file SRF 0 to an N—the scalar register file SRF N–1. N may be an integer greater than or equal to 2.

The vector register files 215 may store results of the partial operations. For example, when a plurality of operation commands indicates the same vector register file among the vector register files 215, a result generated by adding the outcomes of the partial operations, such as multiplication results, associated with specific operation commands, can be stored in the respective vector register file. FIG. 2 shows P vector register files 215 (e.g., a first vector register file VRF 0 to a P vector register file VRF P–1). P may be an integer greater than or equal to 2.

The ALU 217 may perform an arithmetic logic operation required in the partial operation under the control of a control device. For example, the ALU 217 may be a digital circuit that calculates arithmetic operations including addition and subtraction and logical operations including exclusive OR, AND, and OR. However, embodiments are not limited thereto, and the ALU 217 may further include a combination of digital circuits having functions of the MAC operation and/or modulo operation.

According to an embodiment, a partial operation (e.g., a bank partial operation) of the GEMV operation corresponding to the memory bank 220 may be allocated to the PIM block 210 of the memory device 200. This is because the PIM block 210 may only access the adjacent memory bank 220 in the memory device 200. However, the amount of data, such as the read size, that can be loaded via a single operation command might have limitations. Specifically, this data size could be smaller than both the overall size of the memory bank 220 and the size of an individual memory row. Due to such data size limitation, the bank partial operation (or an operation corresponding to the memory row) may be divided into a plurality of operation commands, and the control circuit 211 may perform a plurality of partial operations. For example, the host may transmit operation commands respectively corresponding to weight fragments for a portion of the GEMV operation to the memory device 200. The PIM block 210 may receive operation commands corresponding to a plurality of weight fragments corresponding to the allocated bank partial operation. The PIM block 210 may perform partial operations corresponding to the received operation commands. For example, the control circuit 211 may execute data operations or processing tasks between the first input fragment and a first weight fragment based on a first operation command received from the host using the ALU 217. The control circuit 211 may execute data operations or processing tasks between the second input fragment and a second weight fragment based on a second operation command received from the host using the ALU 217. The first operation command and the second operation command are different operation commands and may include address information indicating memory addresses (e.g., DRAM addresses) where different weight fragments are stored.

In some embodiments, from an operation command corresponding to an arbitrary partial operation, the control circuit 211 may determine a memory address where a weight fragment included in the corresponding partial operation is stored, a scalar register file storing an input fragment included in the corresponding partial operation, and a vector register file where a result of the corresponding partial operation (e.g., a partial operation result) is to be stored. A mapping relationship between these three pieces of information (e.g., a weight-stored memory address, an index of the scalar register file, and an index of the vector register file) will be described based on FIGS. 3 and 4 below.

In some embodiments, the memory device 200 may load different input fragments corresponding to operation commands from the plurality of scalar register files 213. The PIM block 210 may also obtain weight fragments by accessing portions corresponding to the operation commands in the memory bank 220. The memory device 200 may individually perform operations, using the ALU 217, between weight fragments and input fragments. For example, the memory device 200 may execute operations on a one-to-one basis between each weight fragment and its corresponding input fragment. For example, the memory device 200 may perform a multiplication operation between a weight fragment and a corresponding input fragment for each operation command. The memory device 200 may accumulate (e.g., sum) results of the multiplication operation in a corresponding vector register file.

Figure 4:
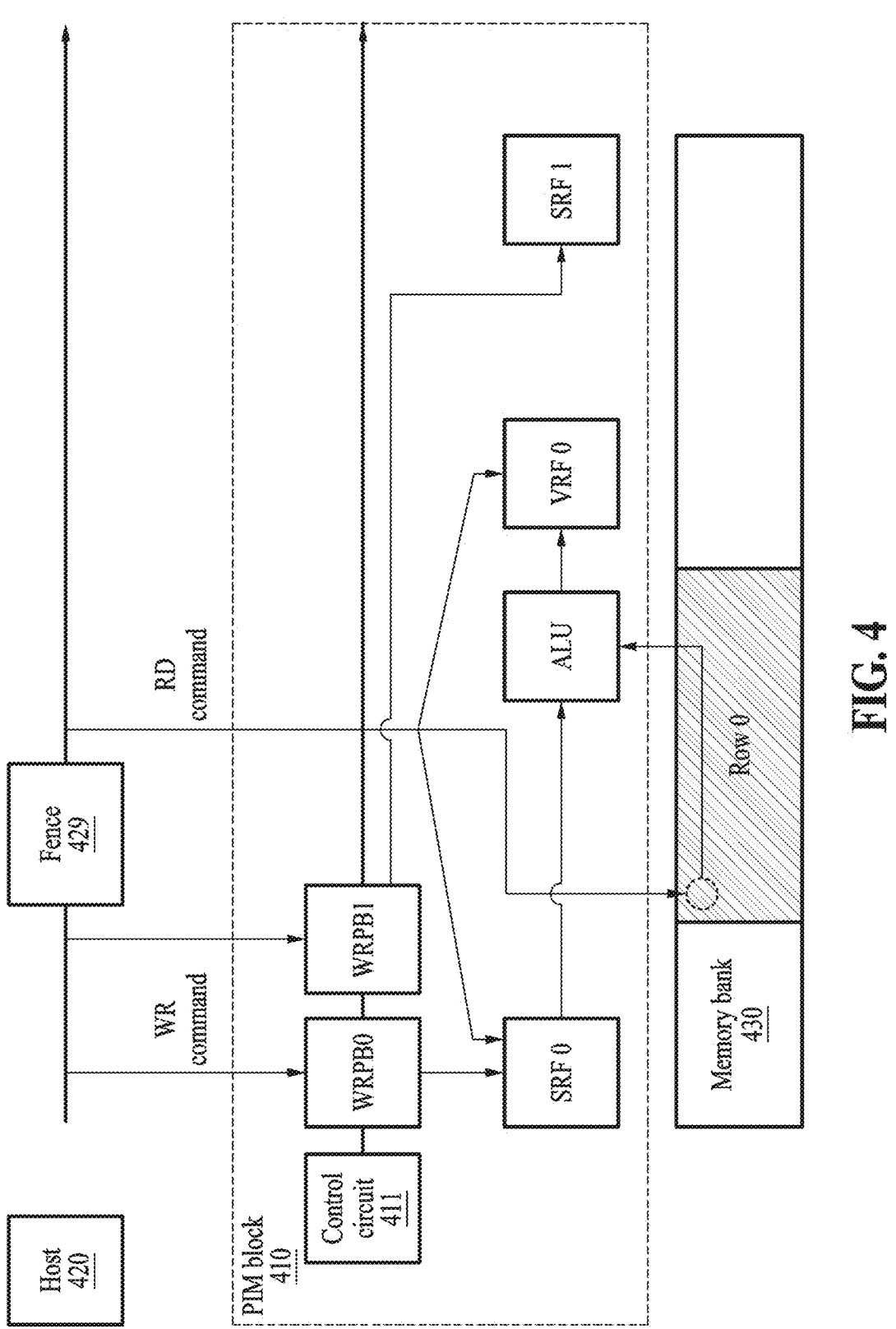

FIGS. 3 and 4 illustrate an operation method in a memory device according to an embodiment.

When a request is transmitted from a host 420 to a memory device (e.g., a DRAM device), the order of the request may be changed by the host 420 and a memory controller. The memory device may execute data operations or processing tasks based on an address (e.g., a memory address) of the request, independent of the order of the request transmitted to and/or received from the host 420. The memory device may use an address aligned mode (AAM) method. In the memory device using the AAM, an index of a scalar register file used for an input and an index of a vector register file used for output may be designated based on a memory address map. The indices for both the scalar register file and the vector register file are determined by the address information of the memory device, independent of the sequence in which requests (such as the DRAM request order) are made for a memory command. The memory address map may be a map of addresses in the memory device (e.g., a memory bank 430) where values are stored. The mapping between memory addresses of the memory address map, the index of the scalar register file, and the index of the vector register file may be defined in advance. A control circuit 411 may include a circuit (e.g., a logic circuit) configured to generate an index of a register file from memory address information of an operation command according to the above mapping.

For example, an arbitrary weight fragment in a weight matrix for the GEMV operation may be stored at an arbitrary memory address in a memory device. An arbitrary scalar register file and an arbitrary vector register file may correspond to a corresponding memory address. In some embodiments, the control circuit 411 may be configured to generate the index of the corresponding scalar register file and the index of the corresponding vector register file from the corresponding memory address. It may be interpreted that the index of the scalar register file in which an input fragment is to be stored and the index of the vector register file in which a result of a partial operation is to be stored are designated in advance based on a memory address, where a weight fragment used for a partial operation of the GEMV operation is stored. Accordingly, the control circuit 411 may access the weight fragment using the operation command, and identify the index of the scalar register file in which an input fragment to be included in a corresponding partial operation is stored, and the index of the vector register file in which a result of the partial operation is to be stored, from the operation command.

A computing system according to an embodiment may offload input values to be included in a partial operation to a memory device before performing an operation. Before the operation command, the host 420 may transmit a write command for writing a partial input vector, which is a portion of an input vector, to a PIM block 410 of the memory device. The write command may include information indicating the index of the scalar register file (e.g., SRF index). For example, in the General Matrix-Vector Multiplication (GEMV) operation, an input fragment requiring multiplication by a corresponding weight fragment may be stored in a scalar register file. This file is mapped to a memory address aligned with the location of the respective weight fragment. Accordingly, an SRF index of the write command may be determined in advance based on the memory address information of the operation command. For example, the write command includes information directly indicating the SRF index and may be different from the memory address (e.g., the DRAM address) of the memory device. According to some embodiments, the write operation writes partial input vectors to the scalar register file at once, and only the SRF index is required in the write operation and a column index indicating individual scalar element values may be unnecessary.

First, the PIM block 410 of the memory device may store a partial input vector in a corresponding scalar register file in response to a write command (e.g., a WR command). FIG. 4 shows an example of the control circuit 411 of the PIM block 410 receiving two WR commands from the host 420. The control circuit 411 may receive a first write command and a second write command. The control circuit 411 may perform write operations WRPB0 and WRPB1 in response to the write commands. The control circuit 411 may write the first partial input vector to the first scalar register file SRF 0, which corresponds to the first write command among the plurality of scalar register files, in response to receiving the first write command for writing a first partial input vector of the input vector. The first partial input vector may be a vector having a plurality of input fragments including a first input fragment (e.g., an input scalar value). The control circuit 411 may write the second partial input vector to the second scalar register file SRF 1, which corresponds to the second write command among the multiple scalar register files, in response to receiving the second write command for a second partial input vector of the input vector. The second partial input vector may be a vector having a plurality of input fragments including a second input fragment (e.g., an input scalar value).

The first scalar register file SRF 0 may store the first input fragment before the first operation command and the second operation command are received. The second scalar register file SRF 1 may store the second input fragment before the first operation command and the second operation command are received. Accordingly, the PIM block 410 may store partial input vectors in the scalar register files in advance and prepare them for subsequent partial operations across multiple memory rows in the memory bank 430. According to some embodiments, the computing system stores the partial input vectors in advance before the partial operations, and the plurality of partial input vectors may be stored in the scalar register files with only one fencing operation 429.

In operation 310, the memory device may load the first input fragment from the first scalar register file SRF 0 and load the first weight fragment from the memory bank 430 based on the first operation command (e.g., an RD command) received from the host 420. In some embodiments, the control circuit 411 of the PIM block 410 may obtain the first weight fragment by accessing a memory row 0 of the memory bank 430 using the first operation command. The control circuit 411 may generate an index indicating the first scalar register file SRF 0 storing the first input fragment to be included in a corresponding partial operation from the same first operation command. The control circuit 411 may select the first scalar register file SRF 0 corresponding to the generated index, and obtain an input fragment (e.g., an input scalar element) corresponding to the first operation command from the selected first scalar register file SRF 0.

In operation 320, the memory device may execute data operations or processing tasks between the first input fragment and the first weight fragment using an ALU. The control circuit 411 of the PIM block 410 may perform a multiplication operation between the first input fragment and the first weight fragment using the ALU. Since the first input fragment is a value in a scalar form and the first weight fragment is data in a vector form, the multiplication result may be in the vector form. The control circuit 411 performs element-wise multiplication by multiplying the first input fragment with each weight in the first weight fragment. Consequently, the result of this partial operation, including the multiplication outcome, maintains the same vector form as the first weight fragment, mirroring its vector dimensions.

The control circuit 411 may identify the first vector register file VRF 0 to store the result of the partial operation that originates from the first operation command. The control circuit 411 may generate an index (e.g., a VRF index) indicating one of the plurality of vector register files from the first operation command. The control circuit 411 may select the first vector register file VRF 0 corresponding to the generated VRF index. The control circuit 411 may store the result of the operation (e.g., the multiplication operation) between the first input fragment and the first weight fragment described above in the selected first vector register file VRF 0.

For example, a weight of one memory row Row 0 of the memory rows may be stored in a row buffer due to limitations (e.g., size limitations) of the row buffer. Accordingly, in order to execute data operations or processing tasks using weights stored in different memory rows, the buffer row may be initialized for an operation of another memory row after the operation in one memory row Row 0 is completed. In some embodiments based on FIG. 7, in a comparative embodiment in which a PIM unit uses a single vector register file, operation results using values of different memory rows may not be differentiated and stored when the memory row is changed. In some embodiments, the memory device according to an embodiment may select a vector register file in which the partial operation result is to be stored, based on both memory column address and memory row address of the operation command. Therefore, even if there is no time corresponding to the fencing operation 429 between operation 320 described above and operation 330 which will be described below, the memory device may store results of partial operations in the vector register file by dividing the results for each of multiple operation commands.

In operation 330, the memory device may load the second input fragment from the second scalar register file SRF 1 and load the second weight fragment from the memory bank 430 based on the second operation command (e.g., the RD command) received from the host 420. Similarly, the control circuit 411 of the PIM block 410 may obtain the second weight fragment by accessing the memory bank 430 using the second operation command. The control circuit 411 generates an index that indicates the second scalar register file SRF 1 as the storage location for the second input fragment. This index is then used in the execution of a partial operation based on the second operation command, allowing the control circuit to specifically access and utilize the second input fragment from SRF 1 for this operation. The control circuit 411 may select the second scalar register file SRF 1 corresponding to the generated index, and obtain an input fragment (e.g., an input scalar element) corresponding to the second operation command from the selected second scalar register file SRF 1.

In operation 340, the memory device may execute data operations or processing tasks between the second input fragment and the second weight fragment using the ALU. The control circuit 411 of the PIM block 410 may perform a multiplication operation between the second input fragment and the second weight fragment using the ALU. In some embodiments, the second input fragment is in scalar form and the second weight fragment is in vector form, and the result of the multiplication may be in vector form. The control circuit 411 may perform element-wise multiplication by multiplying the second input fragment by each of the weights of the second weight fragment. A result of the partial operation (e.g., a multiplication result) may have the same vector form as the vector form (e.g., a vector dimension) of the second weight fragment.

Figure 8:
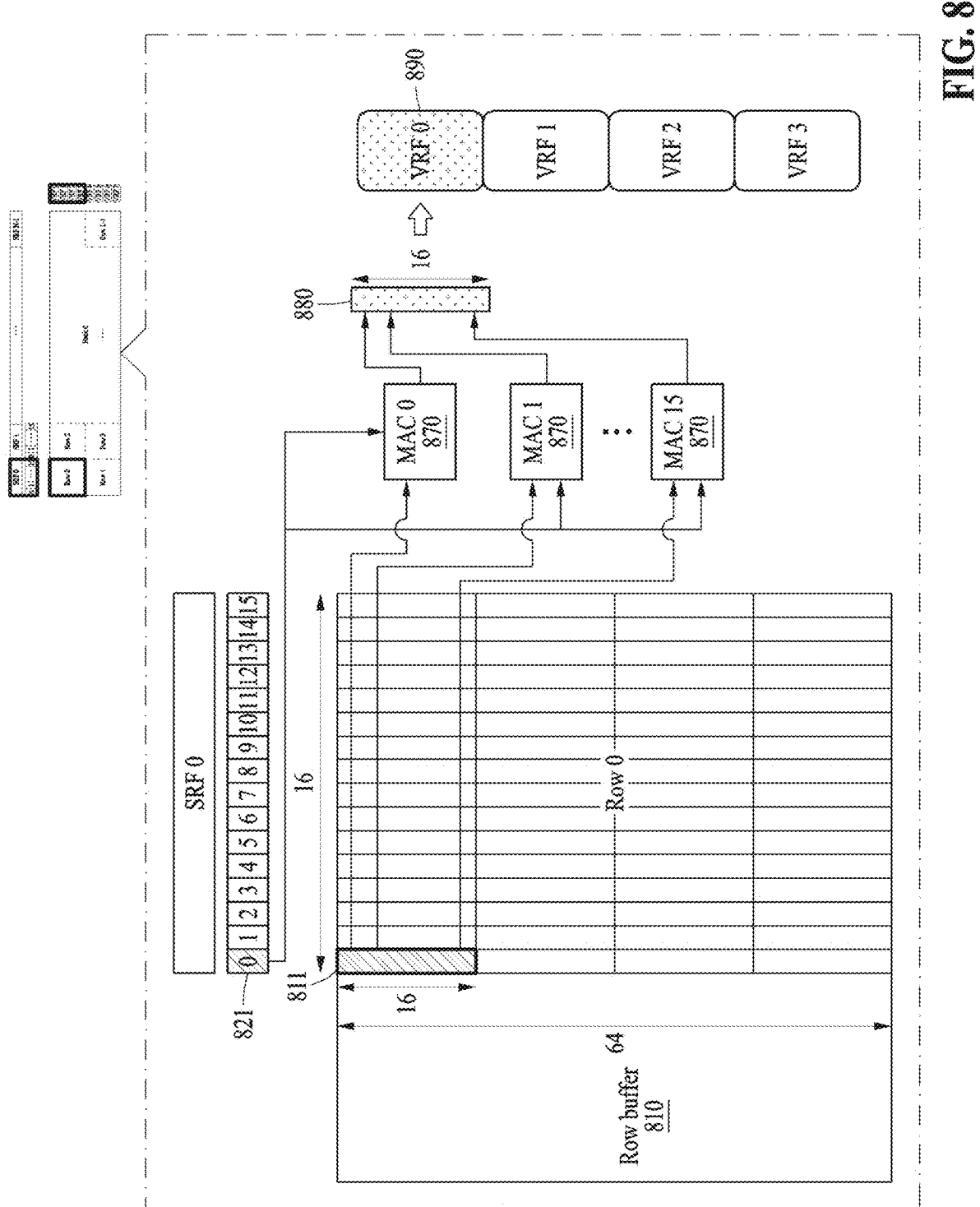
FIGS. 8 to 13 illustrate portions corresponding to various operation a GEMV operation commands according to an embodiment.
Figure 11:
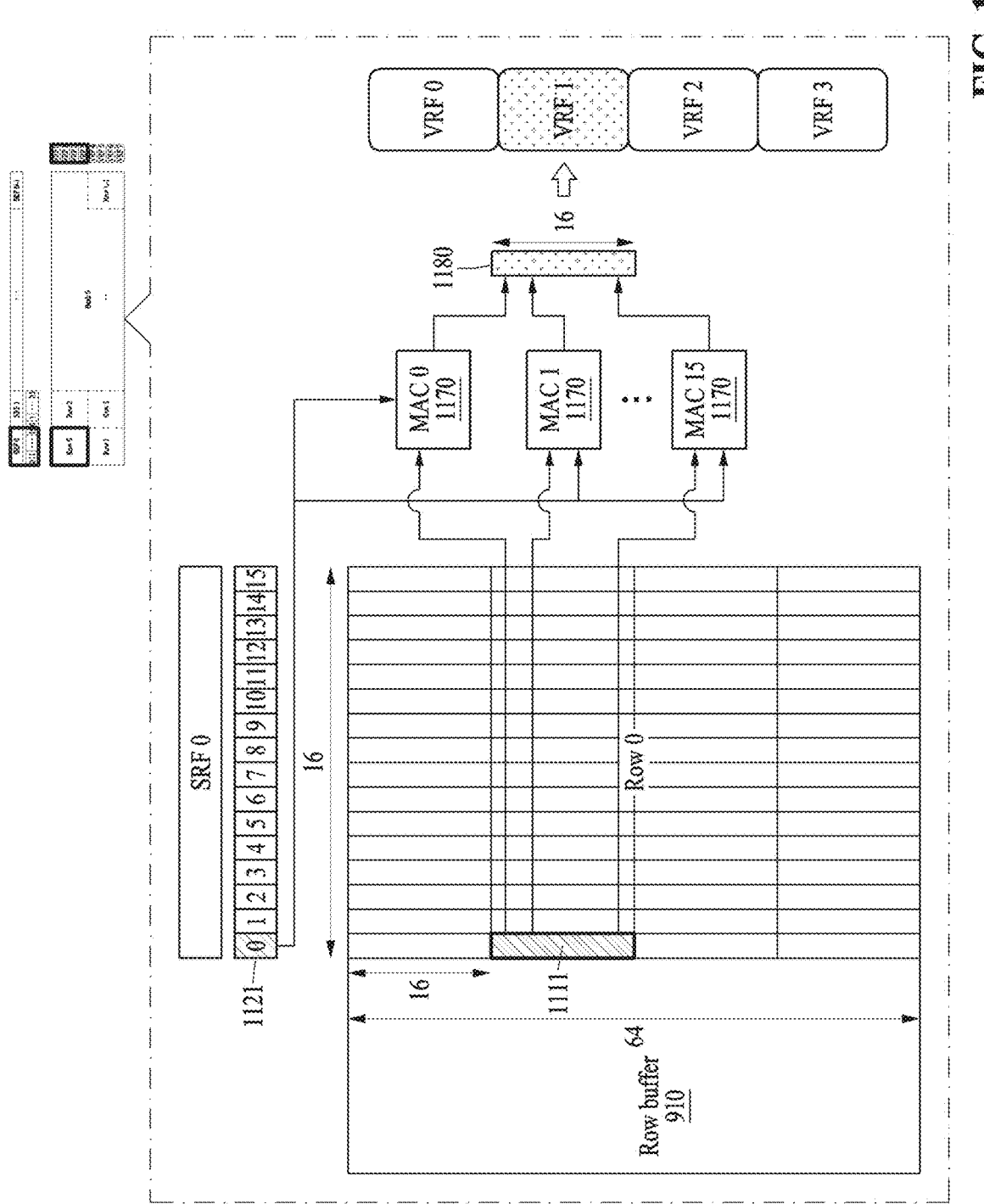
Figure 12:
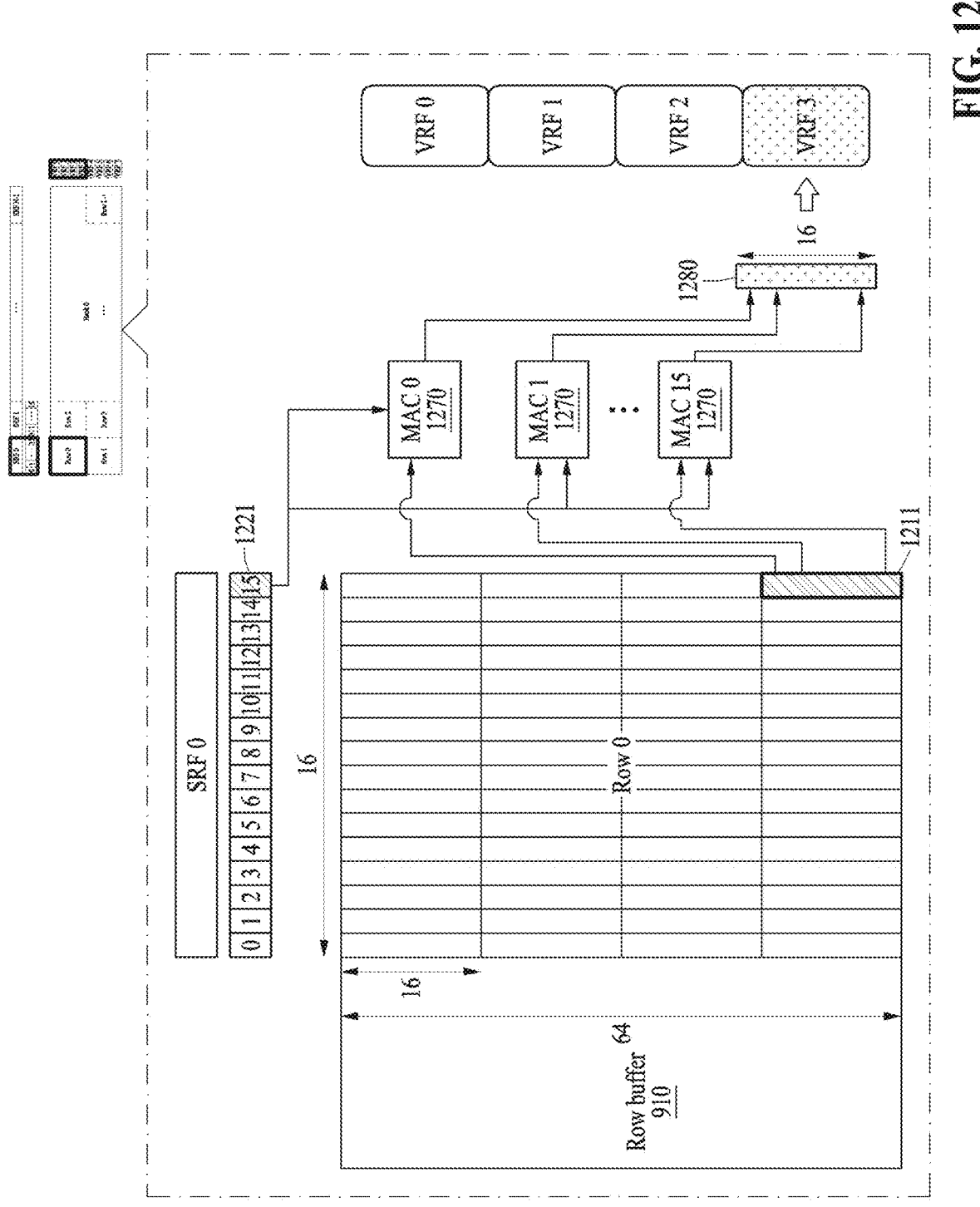
Figure 13:
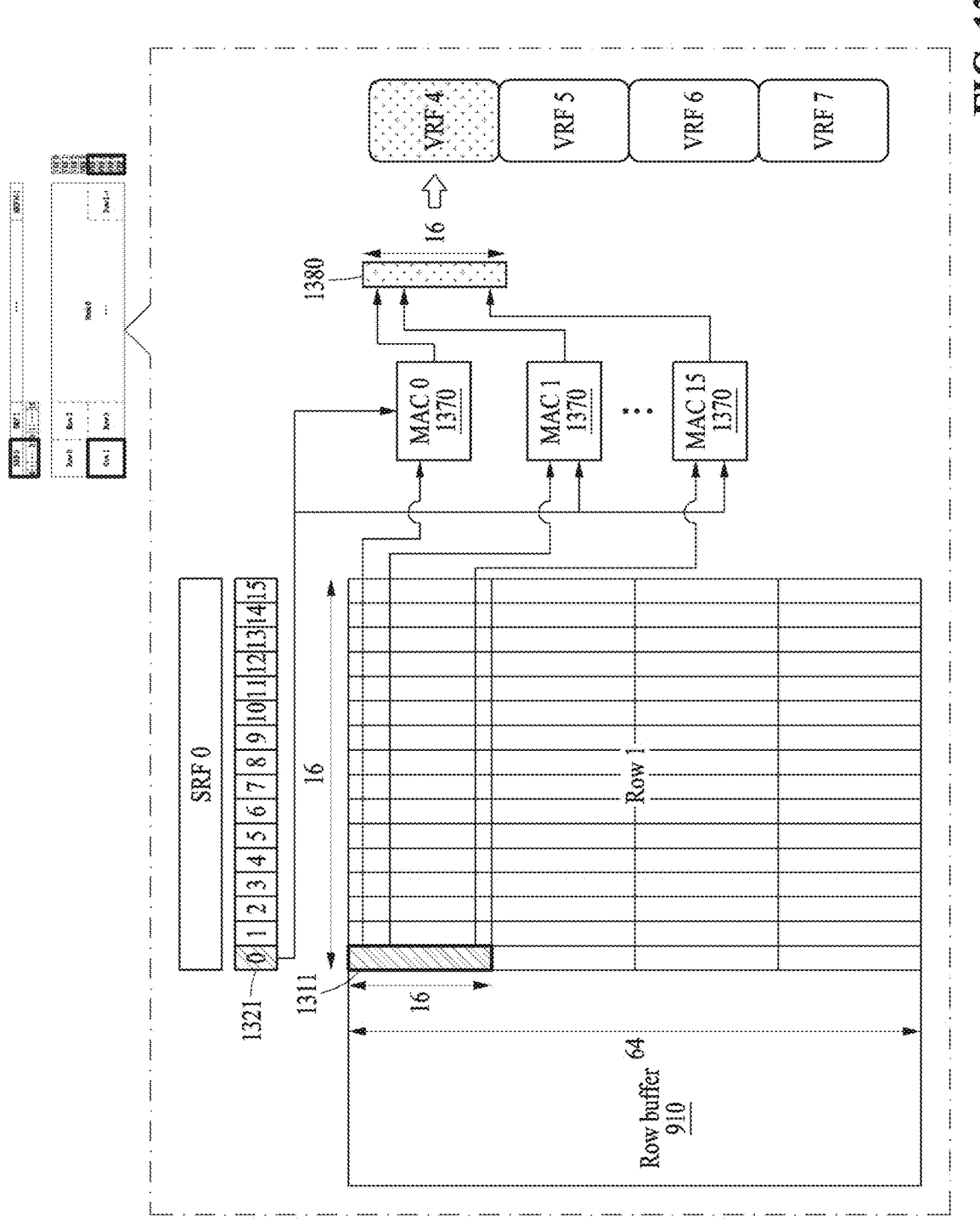

The control circuit 411 may identify a vector register file in which the result of the partial operation from the second operation command is to be stored. The control circuit 411 may generate an index (e.g., a VRF index) indicating one of the plurality of vector register files from the second operation command. When FIG. 8 below shows an example of a VRF index corresponding to the first operation command, FIG. 9 below may show an example of a VRF index corresponding to the second operation command as shown in FIG. 8. FIGS. 11 to 13 below show examples in which VRF indices are different for each of multiple operation commands. The control circuit 411 may select the vector register file corresponding to the generated VRF index. The control circuit 411 may store the result of the operation such as the multiplication between the second input fragment and the second weight fragment, in the chosen vector register file. When the VRF index corresponding to the first operation command is the same as the VRF index corresponding to the second operation command, the control circuit 411 may add a partial operation result based on the second operation command to the first vector register file VRF 0 corresponding to the first operation command.

Figure 5:
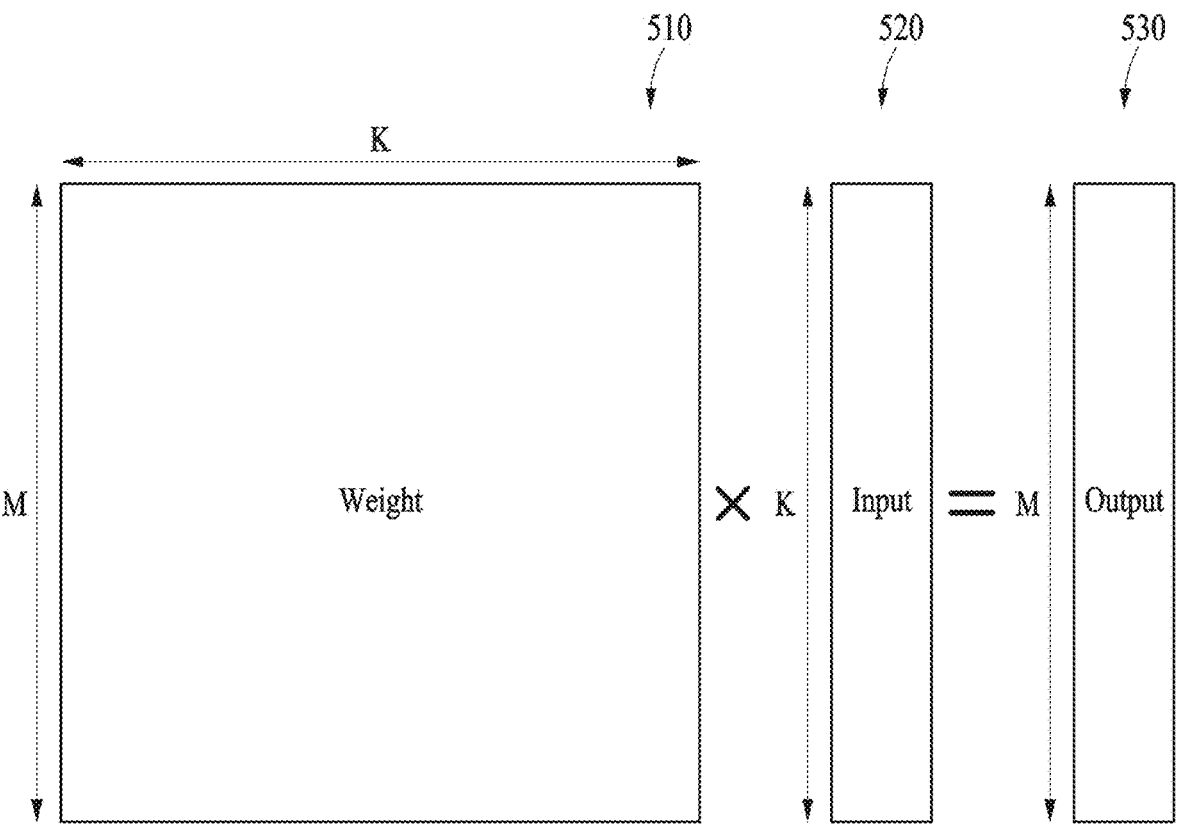
FIG. 5 illustrates a general matrix vector multiplication (GEMV) operation processed in a computing system according to an embodiment.

FIG. 5 illustrates a GEMV operation processed in a computing system according to an embodiment.

The computing system according to an embodiment may perform the GEMV operation as a target operation. The GEMV operation may be a matrix product operation between a matrix and a vector, as shown in FIG. 5. For example, a weight matrix 510 may be a M×K dimensional matrix, an input vector 520 may be a K×1 dimensional vector, and an output vector 530 may be an M×1 dimensional vector. M and K are both integers that are 1 or larger, with K representing the input dimension and M representing the output dimension. For example, here, the dimension may be expressed as the number of elements.

Figure 6:
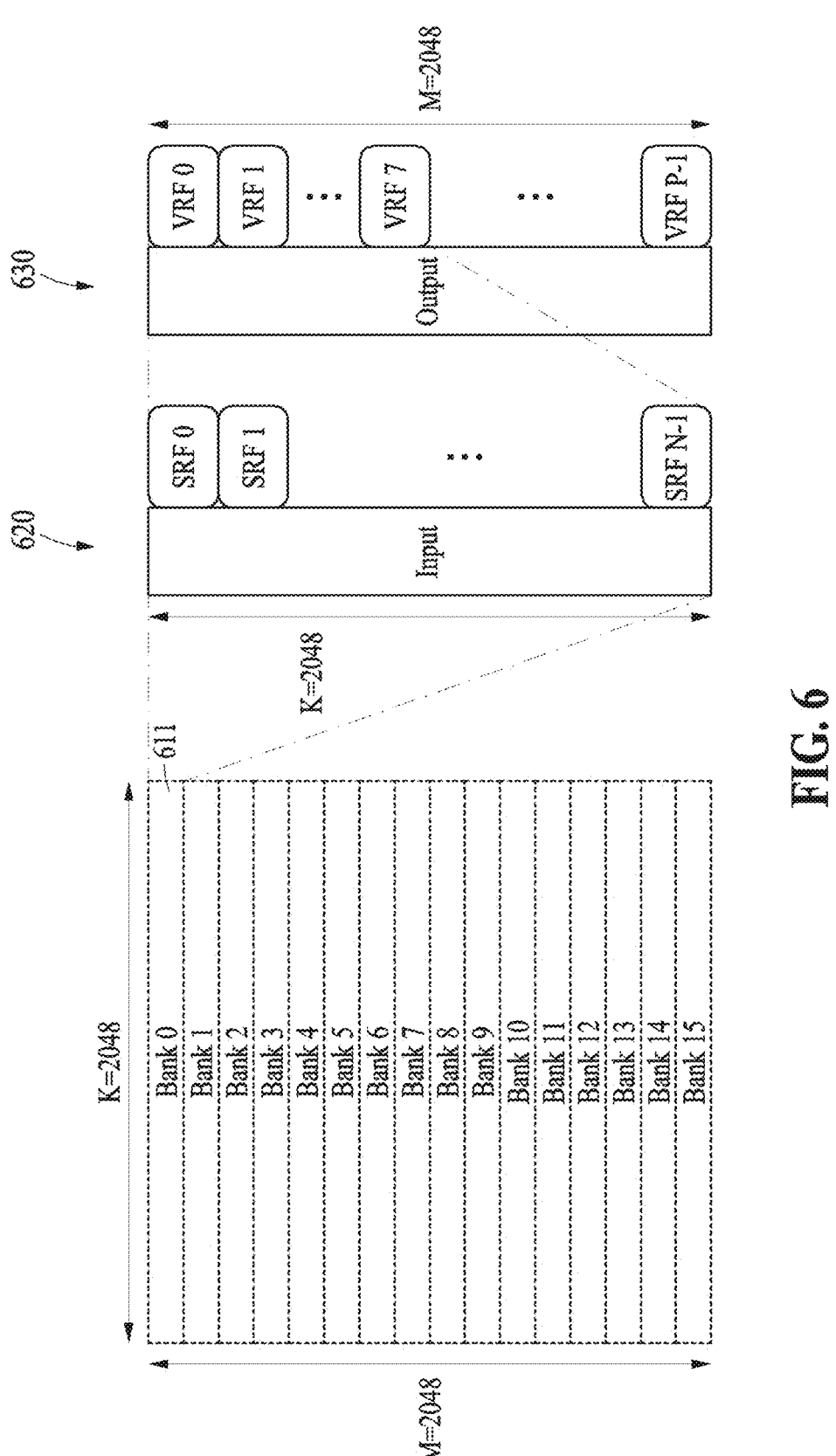
FIGS. 6 and 7 illustrate a portion of a GEMV operation processed by an individual memory bank of a memory device according to an embodiment.
Figure 7:
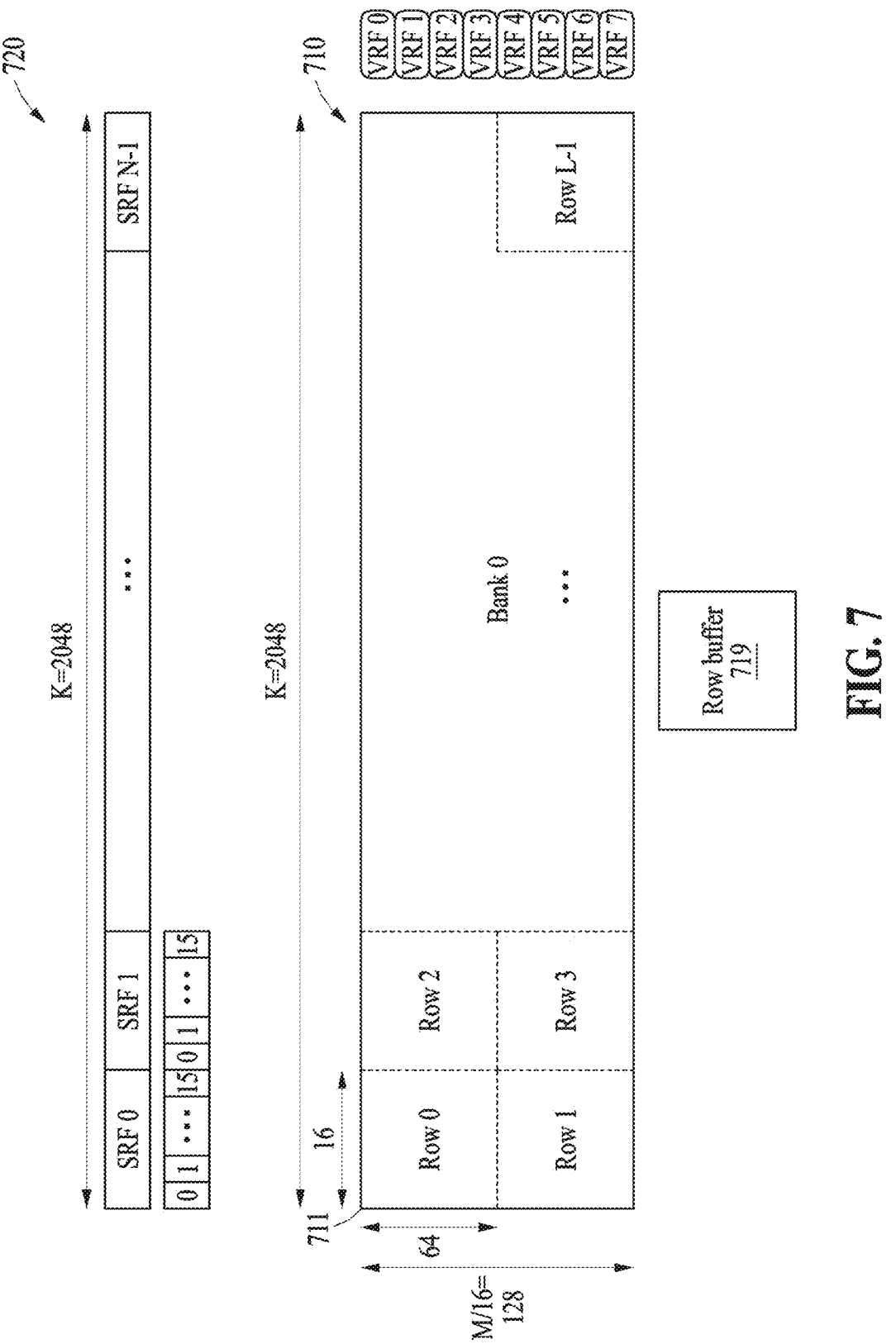

FIGS. 6 and 7 illustrate portions of the GEMV operation processed by the individual memory bank of the memory device according to an embodiment.

In an example, M=2048 items, K=2048 items, and a memory size occupied by individual elements of the matrix and vector is 2 bytes. In this example, an input vector 620 and an output vector 630 may be vectors of 2048×1 dimension. The memory size occupied by the input vector 620 and the output vector 630 may be 4096 bytes. A weight matrix may be a matrix of 2048×2048 dimension. Hereinafter, the size and dimension of vectors and matrices may be expressed based on the number of elements. For example, a read size read by a single operation command may be 32 bytes. Since each element value is expressed in 2 bytes, 16 elements (or values) may be read through one operation command.

FIG. 6 shows that the weight matrix described above based on FIG. 5 is divided into partial weight matrices.

Each partial weight matrix 611 may be stored in a memory bank. For example, as shown in FIG. 6, the weight matrix may be divided into partial weight matrices corresponding to the size of the memory bank in a column direction of the matrix. Each partial weight matrix 611 may be a set of vectors (e.g., row vectors) along a row direction in the matrix. For example, a row of a memory may be referred to as a memory row, a column of a memory may be referred to as a memory column, a row of a matrix may be referred to as a matrix row, and a column of a matrix may be referred to as a matrix column. While the partial weight matrix 611 is described as a set of row vectors of the matrix, a partial weight matrix in embodiments of the present disclosure is not limited thereto, and the weight matrix may be divided in various ways based on the requirements of the system.

FIG. 6 shows an example in which the weight matrix is divided into 16 partial weight matrices using 16 memory banks (e.g., a first bank Bank 0 to a sixteenth bank Bank 15). The partial weight matrix 611 may be a matrix of M/16× K=128×2048 dimension. The partial weight matrix 611 may be multiplied by the input vector 620. The input vector 620 may be divided and stored in N scalar register files. Each scalar register file may store a partial input vector that is a portion of the input vector 620. The result of the operation conducted between the partial weight matrix 611 and the input vector 620 can be stored in a specific section of the various vector register files, ranging from the first vector register file VRF 0 to the P-th vector register file VRF P−1. The operation result between the partial weight matrix 611 and the input vector 620 may be a vector corresponding to a portion of the output vector 630. The result of multiplication between the partial weight matrix 611 and the input vector 620 may be a vector with a dimension of M/16× 1=128×1. Each vector register file may store data as much as the read size (e.g., 32 bytes) corresponding to the operation command. In FIG. 6, since the multiplication result is a vector with a dimension of M/16×1, eight vector register files, as (M/16)/16=128/16=8, may be allocated to a memory bank. For example, partial operation results corresponding to the first memory bank Bank 0 are stored in eight vector register files (e.g., the first vector register file VRF 0 to an eighth vector register file VRF 7).

FIG. 7 shows that the weight matrix described above based on FIG. 5 is divided into partial weight matrices.

According to an embodiment, a memory bank 710 may include a plurality of memory rows. FIG. 7 includes L memory rows. L may be an integer greater than or equal to 2. The partial weight matrix corresponding to the memory bank 710 may be divided into partial matrices corresponding to memory rows. In a partial weight matrix, a size or shape of the partial matrix responsible for the memory row 711 may vary based on the need in the system, and the dimension of the partial weight matrix may be a multiple of the size (e.g., 16 elements corresponding to 32 bytes) corresponding to the operation command in the row direction or the column direction. For example, the column dimension of the partial matrix may be the same as a size of a scalar register file 720. The size of the partial matrix may be the same as the size of the memory row 711 (or a size of a row buffer 719). When the memory row 711 may store 1024 elements (e.g., 2048 bytes) and the scalar register file 720 may store 16 element values (e.g., the number of elements corresponding to 32 bytes), the partial matrix may be a 64×16 dimensional matrix. This is because the number of rows needs to be 1024/16=64, since the number of columns is 16.

In embodiments of the present disclosure, for better understanding, the memory bank 710 and the memory row 711 may be shown based on positions of weight fragments in the weight matrix of the GEMV operation. For example, each memory bank 710 may store a partial weight matrix of the weight matrix of a target GEMV operation. Memory rows in each memory bank 710 may individually store partial matrices forming the corresponding partial weight matrix. Each memory row 711 may be illustrated at a position corresponding to a partial matrix within the partial weight matrix. Accordingly, the memory bank 710 and the memory row 711 may be illustrated differently from the actual physical arrangement or size in the memory device.

A memory bank 710 may include a buffer (e.g., a read buffer) that holds data read in response to a command (e.g., a DRAM command). In embodiments of the present disclosure, an example in which the read buffer is the row buffer 719 will be described. FIG. 7 shows the row buffer 719 as an example of the buffer (e.g., the read buffer). The row buffer 719 may have a size corresponding to the single memory row 711. For example, the row buffer 719 is designed to store and preserve the values from storage cells that belong to a specific memory row, Row 711, within the memory array. In some examples, this row buffer 719 can concurrently hold values that are read from the storage cells of this identical memory row, Row 711. For example, when an operation command indicates a weight fragment having 16 elements and the memory row 711 stores 1024 elements, the PIM block may receive and process 64 operation commands to load weight fragments of the first memory row 711 through the row buffer 719.

For example, In embodiments of the present disclosure, an example in which the memory bank 710 is processed by dividing it into memory rows is described, but embodiments are not limited thereto. The memory bank 710 may be divided into memory columns according to the design, and a column buffer may be used to store and maintain the values of each memory column. In some embodiments, storage cells of the memory bank 710 may be grouped into a plurality of memory groups based on the size of the read buffer. There are no limitations on the size of the read buffer or the grouping method of the memory group. Therefore, unless it is contrary to the description, descriptions based on the memory row 711 of the memory device In embodiments of the present disclosure may also be applied to a memory column or a memory group grouped by another method.

FIGS. 8 to 13 illustrate portions corresponding to various operation commands of a GEMV operation according to an embodiment.

FIG. 8 illustrates an example in which an arbitrary operation command indicates a weight fragment in the memory row of FIG. 7.

According to an embodiment, the control circuit may obtain a weight fragment (e.g., a first weight fragment 811) stored in a first memory row Row 0 by accessing the first memory row Row 0 of the memory bank based on a first operation command. As shown in the drawing, the first memory row Row 0 may be divided into units of the read size of the operation command. The first memory row Row 0 may store a 64×16 dimensional partial matrix, and the partial matrix may be divided into 64 weight fragments. Each weight fragment may be a 16×1 dimensional vector. For example, all weight fragments are shown in a row buffer 810 for intuitive understanding. The control circuit may execute data operations or processing tasks according to the first operation command independent of whether other weight fragments in the first memory row Row 0 are loaded. For example, as soon as the control circuit receives a corresponding weight fragment from the first memory row Row 0 through the row buffer 810 by requesting the first operation command to the memory bank, the control circuit may immediately perform a partial operation corresponding to the first operation command.

The control circuit may select the first scalar register file SRF 0 using the first operation command, and load a first input fragment 821 (e.g., the scalar element value) from the selected first scalar register file SRF 0.

The control circuit may generate a first partial operation result 880 by performing a product operation between the first input fragment 821 and weight values of the first weight fragment 811 using an ALU. MAC units 870 may be formed through a combination of ALUs. FIG. 8 shows an example in which 16 MAC units (e.g., MAC0, MAC1, to MAC15) are formed. Each MAC unit may multiply the first input fragment 821 by a corresponding weight value in the first weight fragment 811. The first partial operation result 880 may be a 16×1 dimensional vector. The control circuit may select the first vector register file VRF 0 from a plurality of vector register files 890 based on the first operation command. The control circuit may store the first partial operation result 880 in the selected first vector register file VRF 0. For example, when there is a value already stored in the first vector register file VRF 0, the control circuit may use the MAC units 870 to sum values of individual elements. For example, the control circuit may update the value stored in the first vector register file VRF 0 by summing the first partial operation result 880, which is a 16×1 dimensional vector, with the 16×1 dimensional vector stored in the first vector register file VRF 0.

Figure 9:
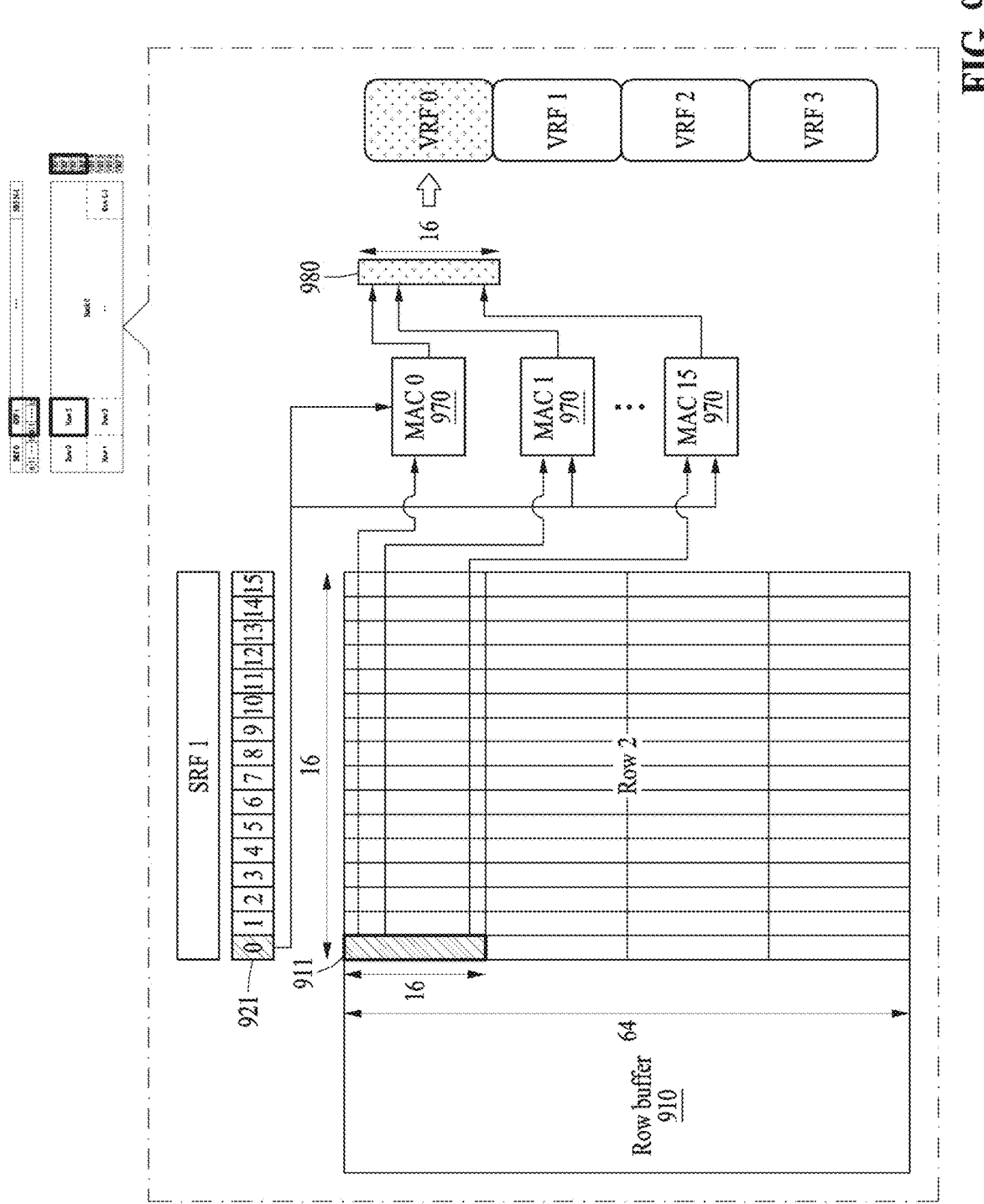

In FIG. 9 below, an operation for a second memory row Row 2 is described for clearer description, but the order of description is not related to the operation order of the memory device. For example, the memory device may execute data operations or processing tasks on the first memory row Row 0 as described in FIGS. 8, 10, 11, and 12. When the operation on the first memory row Row 0 is completed, the memory device may similarly execute data operations or processing tasks for a next memory row Row 1. Then, the memory device may execute data operations or processing tasks for the second memory row Row 2. However, In embodiments of the present disclosure, the memory device is not limited to processing operations in the order of memory rows. For example, FIG. 20 below shows that the memory device performs operations in the order of Row 0, Row 1, Row 2, and Row 3, but the memory device may perform operations in the order of Row 0, Row 2, Row 1, and Row 3. Depending on the design, the memory device may perform operations while changing memory rows in a different order (e.g., randomly), or perform operations of other memory rows before the operation for an arbitrary memory row is completed.

FIG. 9 illustrates an example in which a second operation command indicates a weight fragment of another memory row adjacent to the memory row included in the operation of FIG. 8.

The control circuit may obtain a weight fragment (e.g., a second weight fragment 911) stored in a second memory row Row 2 by accessing the second memory row Row 2 of the memory bank based on the second operation command. The second operation command may indicate the first vector register file VRF 0 which is the same as that of the first operation command. However, the second operation command may indicate the second scalar register file SRF 1 which is different from the first scalar register file SRF 0 corresponding to the first operation command. In some embodiments, since a partial input vector (e.g., a second partial input vector) is also stored in the second scalar register file SRF 1 before the operation, the control circuit may obtain a second input fragment 921 from the second scalar register file SRF 1 without time corresponding to a fence in response to the second operation command. Only the values included in the operation (e.g., a scalar register file and a weight fragment) are different, and the operation process may be the same as or similar to FIG. 8.

The control circuit may execute data operations or processing tasks between the second input fragment 921 and the second weight fragment 911 using MAC units 970. A second partial operation result 980 may be generated by performing a product operation between the second input fragment 921 and the weight values of the second weight fragment 911.

According to an embodiment, when a vector register file identified based on the first operation command is the same as a vector register file identified based on the second operation command among the plurality of vector register files, the control circuit may update values stored in the identified vector register files based on the partial operation result 880 based on the first operation command and the partial operation result 980 based on the second operation command. For example, the control circuit may first store the partial operation result 880 in the vector register file, then load the partial operation result 880 from the vector register file, and store a result of merging the loaded partial operation result 880 and the partial operation result 980 in an identified vector register file (e.g., the first vector register file VRF 0). The process of merging the partial operation result 980 typically involves adding, such as performing a vector sum, the newly calculated partial operation result 980 to the existing partial result that is already stored in the vector register file. For example, when the first operation command and the second operation command indicate the same vector register file (e.g., the first vector register file VRF 0), the control circuit may store a result of merging the first partial operation result and the second partial operation result in the same vector register file. The first partial operation result, the second partial operation result, and the summed result thereof may have the same vector form (e.g., a 16×1 dimensional vector).

Figure 10:
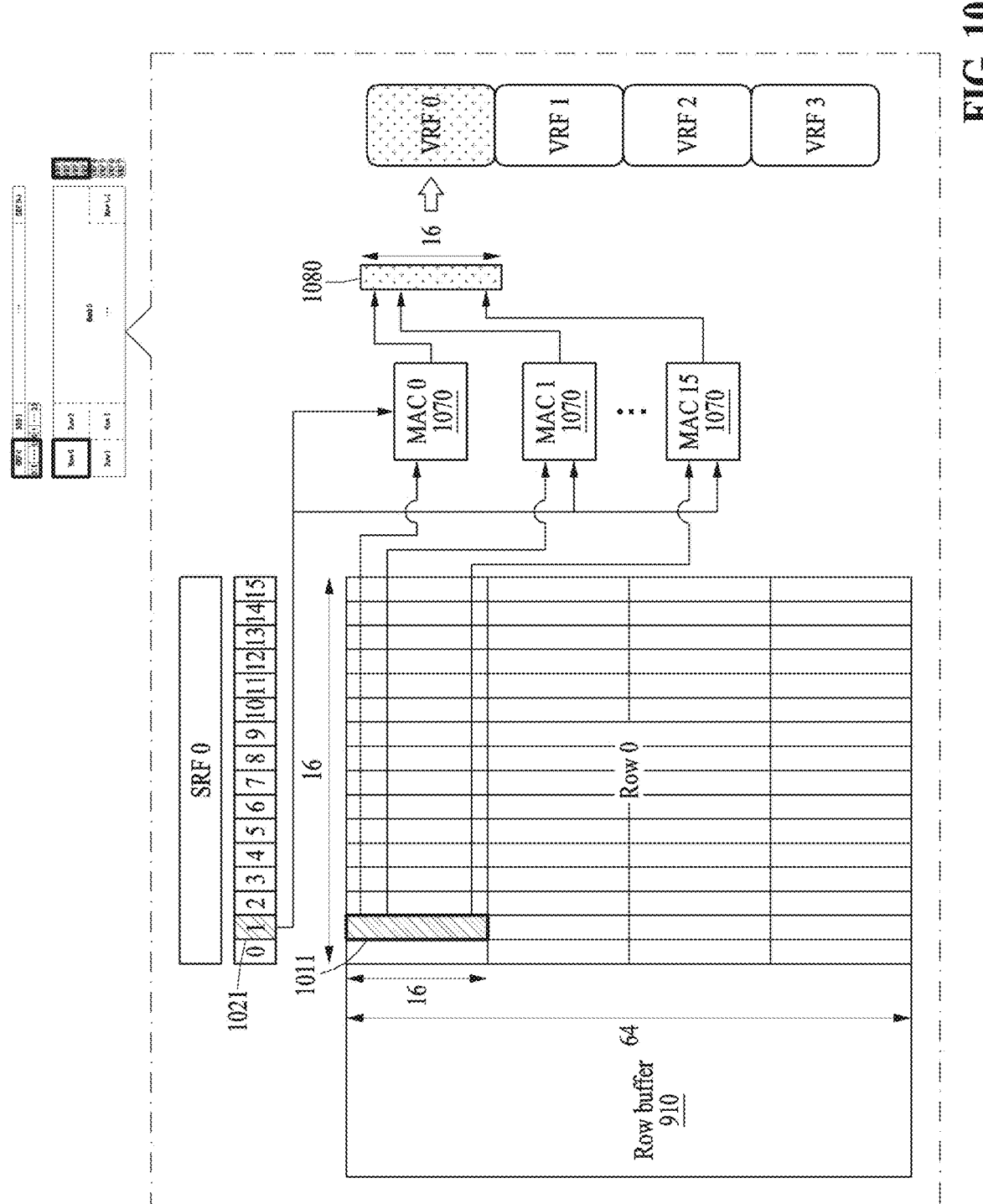

FIG. 10 illustrates an example in which a third operation command indicates the same vector register file in the memory row used for the operation of FIG. 8.

The third operation command may indicate a weight fragment 1011 different from the weight fragment 811 indicated by the first operation command in the memory row to which the weight fragment 811 corresponding to the first operation command belongs. The control circuit may retrieve a different weight fragment 1011 from the same memory row as the weight fragment 811, which corresponds to the first operation command, and an input fragment 1021 from the first scalar register file SRF 0, distinct from the input fragment 821 of the first operation command. This process may be based on the instructions of the third operation command. A partial operation result 1080 corresponding to the third operation command may be generated by performing an operation by MAC units 1070 in the same manner In some embodiments based on FIGS. 8 and 9.

When the first operation command and the third operation command indicate the same vector register file (e.g., the first vector register file VRF 0), the control circuit may merge partial operation results corresponding to the first operation command and the third operation command in the same vector register file. The merging of the partial operation results may be performed by summing vectors in the same form, In some embodiments based on FIG. 9. Each MAC unit may sum up corresponding element values.

FIGS. 11 and 12 illustrate an example in which a fourth operation command indicates different vector register files in the memory row used for the operation of FIG. 8.

The fourth operation command may indicate weight fragments 1111 and 1211 different from the weight fragment 811 indicated by the first operation command in the memory row to which the weight fragment 811 corresponding to the first operation command belongs. Based on the fourth operation command, the control circuit may obtain an input fragment 1121. The control circuit may obtain the corresponding weight fragments 1111 and 1211 based on the fourth operation command. Partial operation results 1180 and 1280 corresponding to the fourth operation command may be generated by performing an operation by MAC units 1170 and 1270 in the same manner as described above with reference to FIGS. 8 and 9.

In examples where the first operation command and the fourth operation command are directed towards different vector register files, the control circuit may be used to handle each operation independently. Specifically, the control circuit may merge the partial operation results from the first operation command and the fourth operation command separately within their respective vector register files. For example, this individual merging process ensures that the results corresponding to each command are accurately and distinctly consolidated within their designated vector register files. For example, in the example shown in FIG. 11, the fourth operation command may indicate the different vector register file VRF 1. The control circuit may merge (e.g., vector summing) the partial operation result 1180 in the different vector register file VRF 1.

FIG. 12 shows an operation based on another fourth operation command which is different from that of FIG. 11. For example, in the example shown in FIG. 12, the fourth operation command may have another vector register file VRF 3. The control circuit may merge the partial operation result 1280 in the other vector register file VRF 3.

The processing of operation commands for weight fragments in one memory row may be performed by the method described based on FIGS. 8 and 10 to 12.

FIG. 13 illustrates an example in which a fifth operation command indicates a weight fragment of a memory row different from the memory row included in the operation of FIG. 8.

The control circuit of the PIM block may also execute data operations or processing tasks of operation commands indicating different memory rows in the same or similar manner as described based on FIGS. 8 to 12. For example, the second operation command described based on FIG. 9 indicates a scalar register file different from the scalar register file of the first operation command, however, the fifth operation command shown in FIG. 13 may indicate a scalar register file (e.g., the first scalar register file SRF 0) which is the same as that of the first operation command.

Based on the fifth operation command, the control circuit may load an input fragment 1321 from the first scalar register file SRF 0, and load a weight fragment 1311 from the memory row Row 1. The control circuit may, using MAC units 1370, generate a partial operation result 1380 by executing an operation, such as a product operation, between the input fragment 1321 and the weight fragment 1311. The control circuit may sum and store the partial operation result 1380 in a vector register file VRF 4 indicated by the fifth operation command. For example, a group of vector register files (e.g., VRF 0 to VRF 3) used by the operation commands described based on FIGS. 8 to 12 may be different from a group of vector register files (e.g., VRF 4 to VRF 7) used for the memory row Row 1 of FIG. 13.

FIGS. 14 and 15 illustrate loading of an input fragment stored in a scalar register file according to an embodiment.

The control circuit may include a circuit configured to generate indexes indicating a scalar register file storing an input value corresponding to a corresponding operation command, and a vector register file in which a partial operation result is to be stored, from address information (e.g., row address information and column address information) of the operation command. The index of the scalar register file in which a value to be included in an operation is to be stored, may be mapped to the index of the vector register file in which the operation result is to be stored, for each memory address of a memory array. The host, the memory device, or both, may determine the specific scalar register file for storing input values intended for the operation. In some cases, The host, the memory device, or both, identify the storage location for weight values, such as a particular memory address. These determinations are based on a predefined mapping between memory addresses and the indexes of the register files. Hereinafter, a structure for loading stored input values according to a mapping relationship that is determined in advance at the time of design and manufacturing will be described.

For example, FIG. 14 shows an example in which a control circuit 1400 includes an SRF index generator 1410.

The control circuit 1400 may select a first scalar register file among a plurality of scalar register files 1430 based on memory row information of a first operation command. In some embodiments, the memory row information may include a row address indicating a memory row storing a corresponding weight fragment from the memory address information. The control circuit 1400 may select, as a first input fragment, one input scalar element among a plurality of input scalar elements of the first scalar register file based on memory column information of the first operation command. The memory column information may include a column address that specifies the particular memory column within the memory address information where the weight fragment is stored. The control circuit 1400 may include, for example, the SRF index generator 1410.

The SRF index generator 1410 may generate an index for identifying a scalar register file to be used for an operation command received among the plurality of scalar register files 1430. The SRF index generator 1410 may include an address check unit 1411, an SRF column index generator 1413, and an SRF selector 1412. The address check unit 1411, the SRF column index generator 1413, and the SRF selector 1412 are hardware logic and may be implemented as digital logic elements and/or circuits.

The address check unit 1411 may receive an operation command (e.g., a DRAM command) transmitted from the host. The address check unit 1411 may extract memory address information from the operation command. The address check unit 1411 may include digital logic that refers to bit values in a bit range (e.g., specific bit positions) indicated by the operation command. The address check unit 1411 may transmit row address information among the extracted memory address information to the SRF selector 1412. However, embodiments are not limited thereto. The address check unit 1411 may transmit at least one of row address information and column address information to the SRF selector 1412. The address check unit 1411 may transmit column address information among the extracted memory address information to the SRF column index generator 1413. However, embodiments are not limited thereto. The address check unit 1411 may transmit at least one of row address information or column address information to the SRF column index generator 1413.

The SRF selector 1412 may select a scalar register file to be used for an operation command based on the row address information and the number of scalar register files 1430 included in the PIM block. For example, the SRF selector 1412 may be implemented as digital operation logic including a modulo operation unit and an ALU. In some examples, a modulo operation unit can be a part of the arithmetic logic unit (ALU) or could be a separate functional unit. The SRF selector 1412 may calculate a remainder by performing a modulo operation on a memory row index extracted from the row address information. The SRF selector 1412 may determine an SRF index based on the calculated remainder. The SRF selector 1412 may generate an SRF selection signal corresponding to the SRF index. The SRF selector 1412 may select one scalar register file among the plurality of scalar register files 1430 by transmitting the SRF selection signal to a selection device (e.g., a multiplexer (MUX)).

However, embodiments are not limited thereto, and the SRF selector 1412 may select a scalar register file based on at least one of the row address information or the column address information.

The SRF column index generator 1413 may select a specific data element, which will be utilized in the operation defined by the operation command, from within the corresponding scalar register file. This selection is based on the column address information and takes into account the total number of data elements contained in the scalar register file. The element stored in the scalar register file is an input fragment and may have a scalar element value. The SRF column index generator 1413 may be implemented as digital operation logic including a modulo operation unit and an ALU. The SRF column index generator 1413 may calculate a remainder by performing a modulo operation on a memory column index extracted from the column address information. The SRF column index generator 1413 may determine a scalar element index based on the calculated remainder. The SRF column index generator 1413 may generate an SRF column index signal corresponding to the SRF index. The SRF column index generator 1413 may select one scalar element value among a plurality of scalar element values by transmitting the SRF column index signal to a selection device (e.g., a demultiplexer (DEMUX)). However, embodiments are not limited thereto, and the SRF column index generator 1413 may select a scalar element value based on at least one of the row address information or the column address information.

The scalar element value of the scalar register file selected as described above may be commonly provided to a plurality of ALUs 1470. Each of the scalar register files 1430 may include a decoder 1431. The decoder 1431 may output a scalar element value corresponding to the SRF column index signal. The scalar element value output by the decoder 1431 may be provided to the ALUs 1470. The control circuit 1400 may perform a partial operation by providing the selected one scalar element value to a plurality of MAC units. The MAC unit may be a unit composed of each or a combination of ALUs 1470.

In some embodiments, the configuration of the SRF index generator is not limited to what has been described above. For example, an SRF index generator 1510 shown in FIG. 15 may be configured to provide an SRF column index signal to all scalar register files.

FIG. 16 illustrates selection of a vector register file according to an embodiment.

A control circuit 1600 may select one vector register file among a plurality of vector register files 1650 based on memory row information and memory column information of a first operation command. The control circuit 1600 may merge partial operation results into the selected vector register file based on the first operation command. The control circuit 1600 may include a VRF index generator 1610 for selecting a vector register file.

The VRF index generator 1610 may generate an index (e.g., a VRF index) indicating a vector register file in which a result of a partial operation corresponding to an operation command is to be stored. The VRF index generator 1610 may include an address check unit 1611 and a VRF select unit 1612. The address check unit 1611 and the VRF select unit 1612 are hardware logic and may be implemented as digital logic elements, circuits, or both.

The address check unit 1611 may extract address information (e.g., a row address and a column address) of a memory (e.g., a DRAM) from an operation command (e.g., a DRAM command). The address check unit 1611 may include digital logic that refers to bit values in a bit range (e.g., specific bit positions) indicated by the operation command. The address check unit 1611 may transmit extracted address information to the VRF select unit 1612.

The VRF select unit 1612 may select a vector register file to be used for an operation based on a memory row address, a memory column address, and the number of the plurality of vector register files 1650. The VRF select unit 1612 may be implemented as digital operation logic including a modulo operation unit and an ALU. The VRF select unit 1612 may generate an index (e.g., a VRF index) indicating a vector register file to be included in the operation. The VRF select unit 1612 may generate a VRF selection signal corresponding to the VRF index. The VRF select unit 1612 may transmit the VRF selection signal to the plurality of vector register files 1650. A decoder 1651 may select a vector register file indicated by the VRF selection signal. The control device may merge (e.g., vector sum) a partial operation result 1690 into the selected vector register file.

FIGS. 17 to 20 illustrate that time corresponding to a fence is reduced in a memory device that uses a plurality of scalar register files and a plurality of vector register files according to an embodiment.

Figure 17:
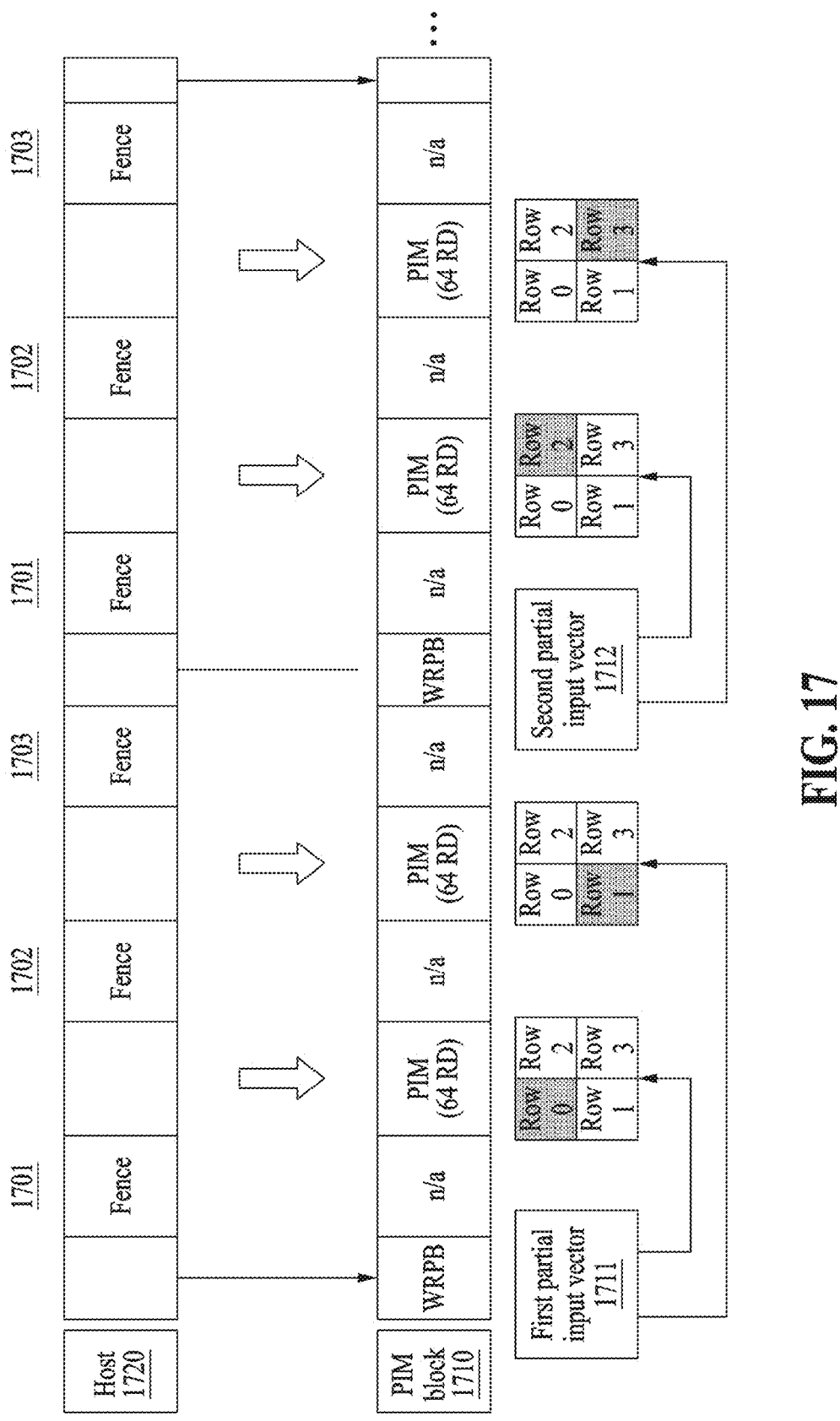
FIGS. 17 to 20 illustrate that time corresponding to a fence is reduced in a memory device that uses a plurality of scalar register files and a plurality of vector register files according to an embodiment.

FIG. 17 illustrates fencing operations according to a comparative embodiment.

An AAM provided In some embodiments has a narrow range for preventing reordering of a memory request. In some embodiments, an operation may be performed on only a single memory row by the AAM, and a host 1720 needs to perform a fencing operation each time the operation of each memory row is completed. For example, an operation on weight fragments of one memory row may be performed using 64 operation commands. In some embodiments, the fencing operation may be required in three situations.

A first fencing operation 1701 may occur between a write operation of a partial input vector and a PIM operation. In some embodiments, when the order of memory requests of the host 1720 to the memory device is not ensured, an operation may occur, and the error includes using a value different from an input value that is to used for the operation. In some embodiments, in order to ensure that the PIM operation is performed after partial input vectors 1711 and 1712 are stored in scalar register files, the host 1720 may perform the first fencing operation 1701 after a write command of each of the partial input vectors 1711 and 1712.

A second fencing operation 1702 may occur when a memory row accessed by a PIM block 1710 is changed. In some embodiments, since the row address information of the memory row is not used, it is not ensured whether a weight value stored in a row buffer is a value of the memory row before or after the change. Accordingly, In some embodiments, the host 1720 may perform the second fencing operation 1702 when changing the memory row.

A third fencing operation 1703 may occur after operations by the PIM block 1710 are completed and before the new partial input vector 1712 is stored in the scalar register file. In some embodiments, the PIM block 1710 may receive an operation command using a second partial input vector before sufficient time has elapsed from the operation according to the operation command using the first partial input vector. In this example, it is not ensured whether the operation by the PIM block 1710 uses the first partial input vector or the second partial input vector. Accordingly, In some embodiments, the host 1720 may perform the third fencing operation 1703 before writing a new input vector.

In some embodiments, the fencing operations 1701, 1702, and 1703 may be operations that cause the host 1720 to wait for a sufficient time before and after writing and/or reading each value in order to ensure the integrity of the PIM operation. Although it may vary depending on the type of host 1720, the fencing operations 1701, 1702, and 1703 may take approximately hundreds of cycles. The host 1720 may execute a fencing operation. The memory device may not receive additional commands during the time corresponding to the fence. Since the time for performing 64 operation commands is approximately 256 cycles, the overhead due to the fencing operation should be reduced.

Figure 18:
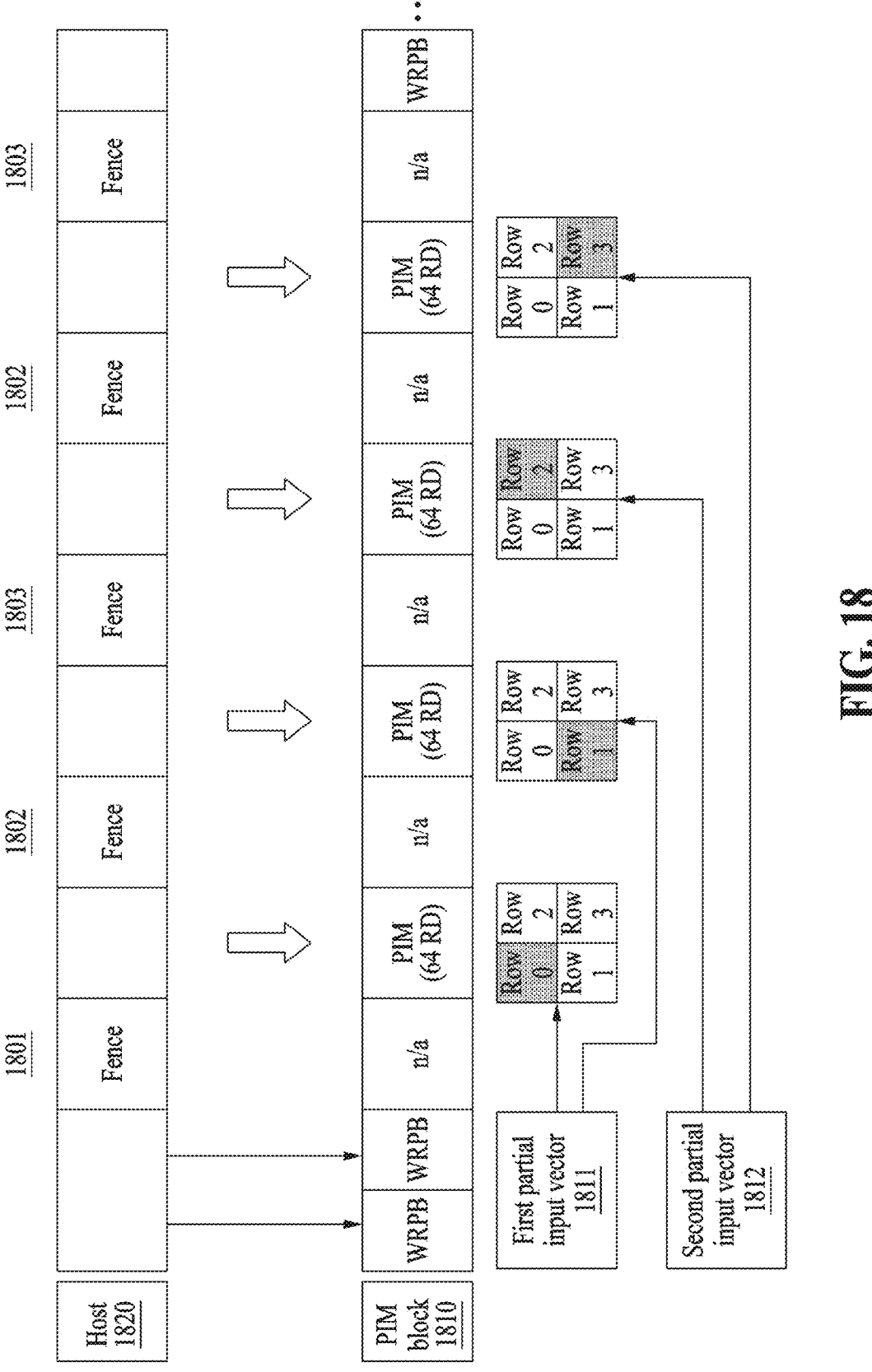

FIG. 18 illustrates an operation performed when a PIM block includes a plurality of scalar register files in an embodiment.

A control circuit of a PIM block 1810 may receive, from a host 1820, a first write command for writing a first partial input vector 1811 of an input vector to a first scalar register file, and a second write command for writing a second partial input vector 1812 to a second scalar register file. For example, prior to executing a target operation or a segment of the target operation, the host 1820 might send several write commands to the PIM block 1810, each command pertaining to different partial input vectors. Accordingly, the PIM block 1810 may perform a first write operation and a second write operation without the time corresponding to a fence between the first write operation based on the first write command and the second write operation based on the second write command. This is because the PIM block 1810 according to an embodiment includes a plurality of scalar register files and may store and maintain several partial input vectors. Accordingly, the integrity of the PIM operation may be ensured with only one first fencing operation 1801 for the plurality of partial input vectors 1811 and 1812.

For example, in the example shown in FIG. 18, the first partial input vector 1811 may be used for operations of a first memory row Row 0 and a second memory row Row 1. The second partial input vector 1812 may be used for operations of a third memory row Row 2 and a fourth memory row Row 3. In the example shown in FIG. 17, the first fencing operation 1701 is required after the operation of the second memory row Row 1 is completed and before the operation of the third memory row Row 2 starts. In some embodiments, in the example shown in FIG. 18, since the second partial input vector 1812 is stored in the scalar register file in advance, the first fencing operation 1801 may be unnecessary after a third fencing operation 1803. Accordingly, the host 1820 and the PIM block 1810 according to an embodiment may reduce the use of the first fencing operation 1801. For example, the second fencing operation 1802 may be removed as described based on FIG. 19 below.

Figure 19:
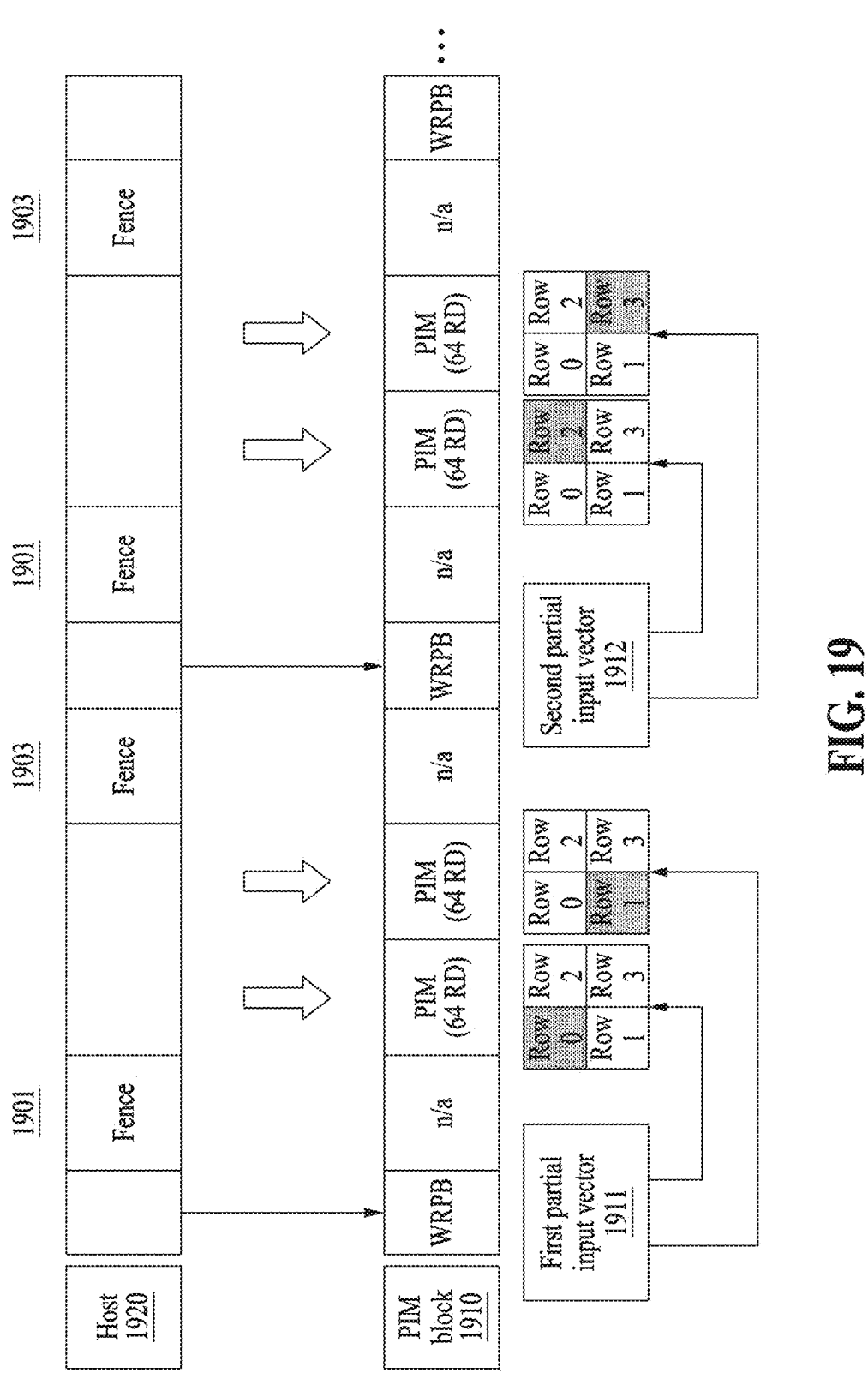

FIG. 19 illustrates an operation performed when a PIM block includes a plurality of vector register files in an embodiment.

A control circuit of a PIM block 1910 may perform operations using the same partial input vector, and weight fragments of different memory rows in the same memory bank without time corresponding to a fence between multiple operations. For example, the time corresponding to the fence may not occur between operations using a first partial input vector 1911. Similarly, the time corresponding to the fence may not occur between operations using a second partial input vector 1912. Referring to FIG. 19, in the PIM block 1910, both the memory row and the memory column are taken into account when processing an operation command. This approach leads to the identification of the specific weight fragment from a memory row used for the operation, even when the memory row changes. Accordingly, the PIM block 1910 may perform the operation immediately without the fence when performing the operation of the second memory row Row 1 after the operation of the first memory row Row 0. The PIM block 1910 may distinguish an operation result of the first memory row Row 0 and an operation result of the second memory row Row 1 and store the operation results in different vector registers.

Accordingly, the host 1920 may only perform a first fencing operation 1901 and a third fencing operation 1903 and may not perform a second fencing operation.

Figure 20:
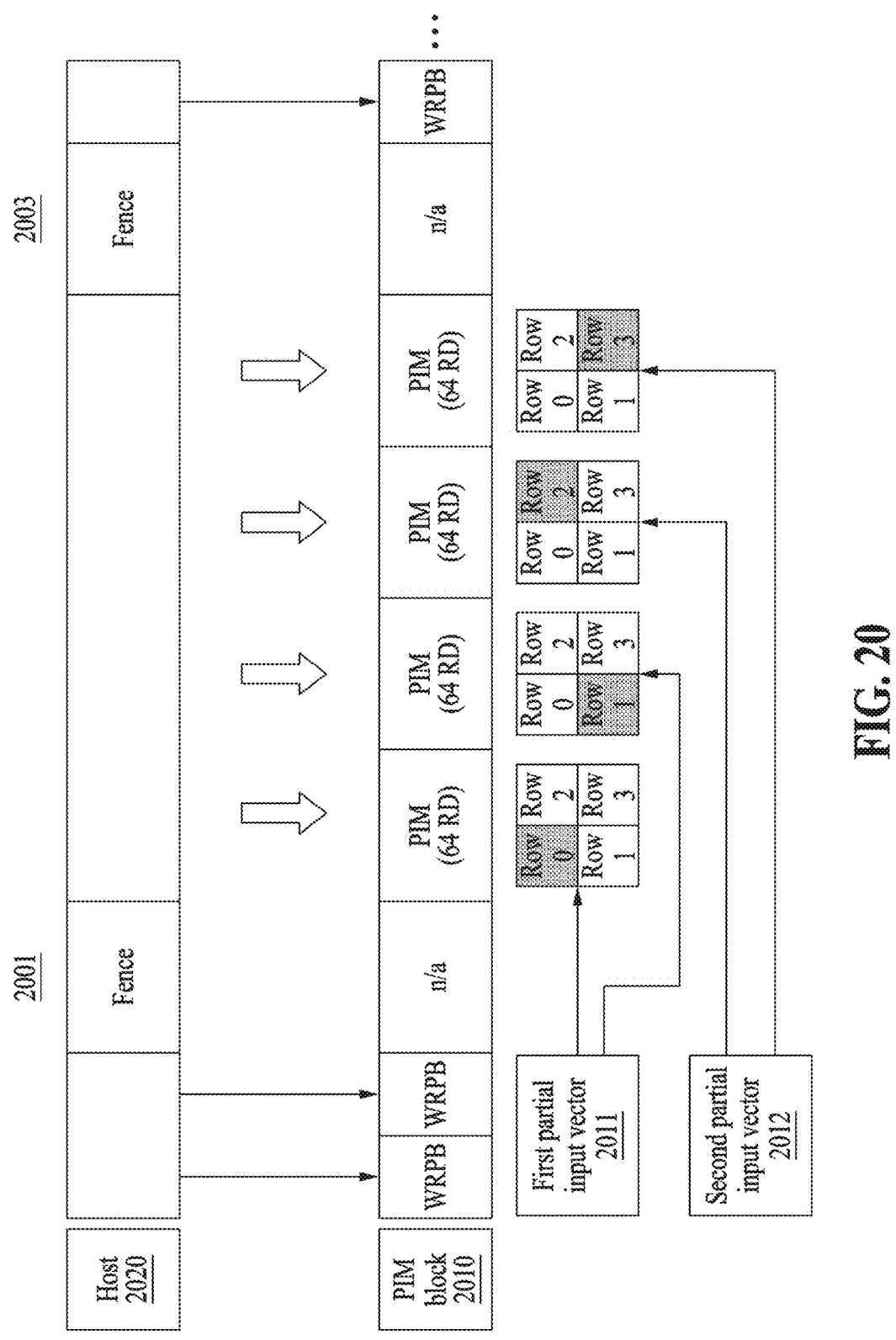

FIG. 20 shows an example including both a plurality of vector register files and a plurality of scalar register files.

The control circuit may perform operations using different partial input vectors 2011 and 2012, and weight fragments of different memory rows in the same memory bank without time corresponding to a fence. For example, FIG. 20 shows a first memory row Row 0, a second memory row Row 1, a third memory row Row 2, and a fourth memory row Row 3 belonging to the same memory bank.

In an embodiment, both the host 2020 and the PIM block 2010 may carry out a first fencing operation 2001. The first fencing operation 2001 occurs when writing partial input vectors to scalar register files prior to executing a target operation, to cause that the partial input vectors are fully stored in the scalar register files. After the operation on memory rows corresponding to the target operation is completed, the host 2020 may perform a third fencing operation 2003. The remaining fencing operations may be removed.

The PIM block 2010 may process operation commands 2050 corresponding to one memory row and immediately process operation commands corresponding to a next memory row. This is because operation results for each memory row may be stored separately in a plurality of vector register files. Accordingly, the scope of preventing the reordering of memory commands, such as operation commands, within the Address Aligned Mode (AAM) can be broadened to encompass multiple memory rows. The host 2020 and the PIM block 2010 may perform partial operations on several memory rows in the same memory bank without the time corresponding to a second fence. When the partial operations on the plurality of memory rows are completed, the PIM block 2010 may transmit results of the partial operations stored in the plurality of vector register files to the host 2020. The host 2020 may aggregate the partial results to generate an overall operation result.

The PIM block 2010 according to an embodiment may perform operations on the plurality of memory rows and then merge partial operation results. The merged operation result may still be a portion of the overall operation. The PIM block 2010 may transmit the merged operation result to the host 2020. The host 2020 may collect operation results (e.g., partial operation results) received from the PIM block 2010. The host 2020 may aggregate the collected operation results to generate an overall operation result.

Figure 21:
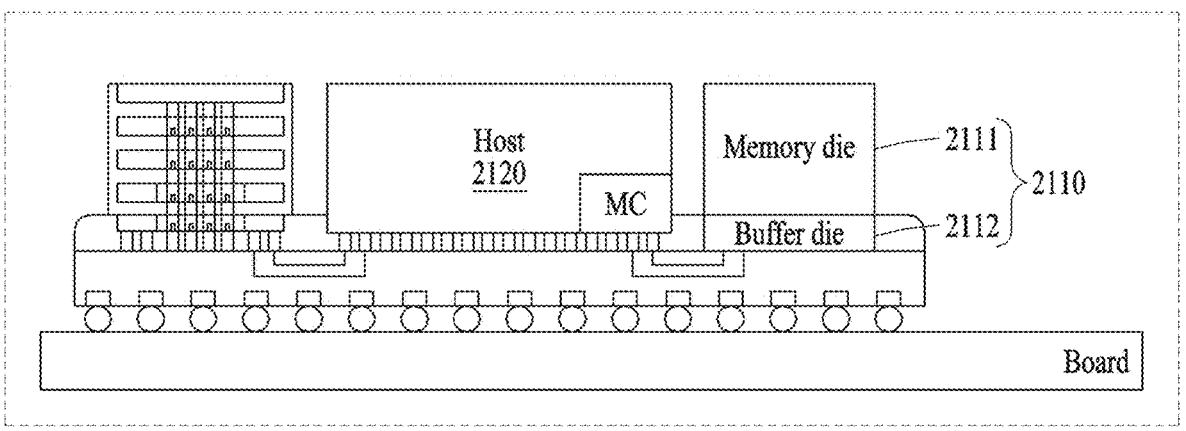
FIG. 21 illustrates a high bandwidth memory (HBM) device according to an embodiment.

FIG. 21 illustrates a high bandwidth memory (HBM) device according to an embodiment.

A memory device 2110 according to an embodiment may be implemented as an HBM device. For example, the memory device 2110 may include a memory die 2111 and a buffer die 2112. The memory device 2110 may be disposed adjacent to a host 2120 including a memory controller. In some embodiments based on FIGS. 1 to 20, the memory device 2110 may perform a partial operation between a corresponding weight fragment and an input fragment with a minimized fence in response to an operation command received from the host 2120.

However, the memory device 2110 is not limited to what is described above. The memory device 2110 may be implemented as a low power double data rate (LPDDR) device, a graphics double data rate (GDDR) device, or a double data rate (DDR) device, as well as the HBM device. A computing system 2100 includes the host 2120 and the memory device 2110. The computing system 2100 may perform machine learning tasks. Machine learning tasks may include aspects of artificial intelligence (AI) and a deep neural network (DNN). For example, the computing system 2100 may include an artificial neural network (ANN). However, embodiments are not limited thereto, and the computing system 2100 may execute a camera application. The computing system 2100 may also be implemented as a wearable device.

Figure 22:
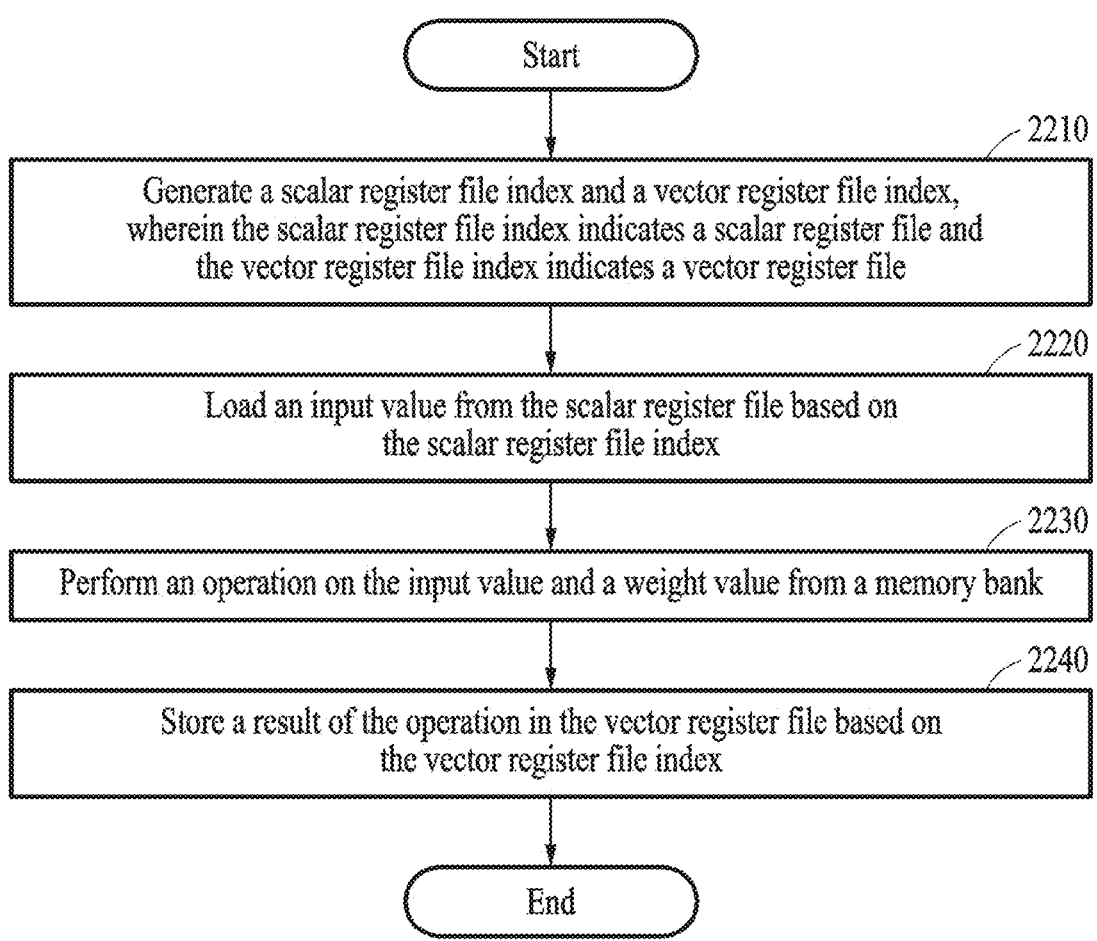
FIG. 22 shows an operation method in memory device according to embodiments of the present disclosure.

FIG. 22 shows an operation method in memory device according to embodiments of the present disclosure. This operation method includes generating scalar and vector register file indices, loading an input value, performing the computational operation, and storing the result in the vector register file.

In operation 2210, the system generates a scalar register file index and a vector register file index, wherein the scalar register file index indicates a scalar register file from among a plurality of scalar register files and the vector register file index indicates a vector register file from among a plurality of vector register files. The generation of these indices can be implemented through various techniques. For example, a dynamic indexing method may be used, allocating indices based on current processing demands or data characteristics. This dynamic generation can facilitate optimal resource allocation, thereby enhancing the efficiency and accuracy of the processing operations.

For example, after the process starts, the system generates a scalar register file index and a vector register file index. For example, in cases involving large-scale matrix computations, the indices can be generated to prioritize speed and data throughput. For example, in cases with more complex but less voluminous data, the indices might be optimized for precision and data integrity. The scalar register file index designates a specific scalar register file from among several available, each tailored to store a particular type of data fragment. The vector register file index identifies and selects a vector register file from a group of vector register files. The selected vector register file will be used for result storage.

In operation 2220, the system loads an input value from the scalar register file based on the scalar register file index. Following the generation of indices, the system loads an input value from a selected scalar register file. The loading process may vary depending on the input value. For example, the loading of the input value may be adjusted according to its type and size.

For example, operation 2200 may involve loading methods tailored to the characteristics of the input value. For instance, when dealing with smaller or simpler data fragments, a straightforward, sequential loading approach might be utilized, ensuring a quick and efficient retrieval of data. For example, for input values that are larger or structurally complex, the system may resort to more advanced techniques such as concurrent or buffered loading. These loading methods may be effective in optimizing the handling of data-intensive tasks, minimizing processing bottlenecks, and enhancing overall system performance.

In operation 2230, the system performs an operation on the input value and a weight value from a memory bank. During this process, the system executes a computational operation on an input value and a weight value, using methods ranging from basic arithmetic to complex functions like matrix operations, tailored to the specific type and requirements of the data involved.

For example, in operation 2230, the system performs a computational process involving the input value and a corresponding weight value from a designated memory bank. This process may range from simple arithmetic calculations to more complex procedures such as matrix multiplication or data transformation algorithms. The method employed may be based on the input and weight values, allowing the system to adapt its computational approach to different data types and processing requirement In operation 2240, the system stores a result of the operation in the vector register file based on the vector register file index. The system stores the output of the computational operation in a designated vector register file, as dictated by the previously determined vector register file index. This process can be used to preserve the integrity and accessibility of the computed data for subsequent use or analysis. The resultant data from the computational operation is stored in the vector register file indicated by the vector register file index.

In some examples, the storage process may be adaptable based on the data to be stored and the system requirements. This storage step can incorporate different techniques based on the system's needs. For example, methods like data compression or format-specific storage can be utilized for efficient space use or to meet specific data handling requirements. For example, in cases where the resultant data is voluminous or complex, the system might employ storage techniques such as hierarchical storage management or utilize buffer memory to ensure a seamless transition of data into the vector register file.

The embodiments described herein may be implemented using a hardware component, a software component, and/or a combination thereof. A processing device may be implemented using one or more general-purpose or special-purpose computers, such as, for example, a processor, a controller, an ALU, a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. In embodiments of the present disclosure, the description of a processing device is used as singular; however, one skilled in the art will appreciate that a processing device may include multiple processing elements and/or multiple types of processing elements. For example, the processing device may include a plurality of processors, or a single processor and a single controller. In some embodiments, different processing configurations are possible, such as parallel processors.

The software may include a computer program, a piece of code, an instruction, or some combination thereof, to independently or uniformly instruct or configure the processing device to operate as instructed. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

In some embodiments, although the embodiments have been described based on the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device comprising:
a first scalar register file storing a first input fragment;
a second scalar register file storing a second input fragment;
an arithmetic logic unit (ALU); and
a control circuit configured to perform, using the ALU, a first operation between the first input fragment and a first weight fragment based on a first operation command received from a host, and to perform, using the ALU, a second operation between the second input fragment and a second weight fragment based on a second operation command received from the host,
wherein the control circuit is configured to perform multiple operations using a same partial input vector and different weight fragments of different memory rows in a same memory bank without time corresponding to a fence between the multiple operations.

2. The memory device of claim 1, wherein the first scalar register file stores the first input fragment before the first operation command and the second operation command are received, and
the second scalar register file stores the second input fragment before the first operation command and the second operation command are received.

3. The memory device of claim 1, wherein the control circuit is configured to:
receive, from the host, a first write command for writing a first partial input vector of an input vector to the first scalar register file, and a second write command for writing a second partial input vector to the second scalar register file; and
perform a first write operation and a second write operation without time corresponding to a fence between the first write operation based on the first write command and the second write operation based on the second write command.

4. The memory device of claim 1, wherein the control circuit is configured to:
write a first partial input vector of an input vector to the first scalar register file among a plurality of scalar register files in response to receiving a first write command; and
write a second partial input vector of the input vector to the second scalar register file among the plurality of scalar register files in response to receiving a second write command,
wherein the first partial input vector comprises a plurality of input fragments including the first input fragment, and
the second partial input vector comprises a plurality of input fragments including the second input fragment.

5. The memory device of claim 1, wherein the control circuit is configured to:
obtain a weight fragment stored in a first memory row of a memory bank by accessing the first memory row based on the first operation command; and
obtain a weight fragment stored in a second memory row of the memory bank by accessing the second memory row based on the second operation command.

6. The memory device of claim 1, wherein the control circuit is configured to:
determine that a first vector register file identified based on the first operation command among a plurality of vector register files is equal to a second vector register file identified based on the second operation command; and
update a value stored in the first vector register file based on a first partial operation result of the first operation command and a second partial operation result of the second operation command in response to the determination.

7. The memory device of claim 1, wherein
a third operation command indicates that a third weight fragment in a same memory row of a first weight fragment is different from the first weight fragment, and
the control circuit is configured to merge partial operation results corresponding to the first operation command and the third operation command in a same vector register file in response to the first operation command and the third operation command indicating the same vector register file.

8. The memory device of claim 7, wherein the control circuit is configured to obtain the third weight fragment and a third input fragment different from the first input fragment based on the third operation command.

9. The memory device of claim 1, wherein
a fourth operation command indicates that a fourth weight fragment in a same memory row of a first weight fragment is different from the first weight fragment, and
the control circuit is configured to individually merge partial operation results corresponding to the first operation command and the fourth operation command in different vector register files in response to the first operation command and the fourth operation command indicating the different vector register files.

10. The memory device of claim 9, wherein the control circuit is configured to obtain a fourth input fragment based on the fourth operation command.

11. The memory device of claim 1, wherein the control circuit is configured to:

select the first scalar register file among a plurality of scalar register files based on memory row information of the first operation command; and select, as the first input fragment, a first input scalar element among a plurality of input scalar elements of the first scalar register file based on memory column information of the first operation command.

12. The memory device of claim 1, wherein the control circuit is configured to:

select a first vector register file among a plurality of vector register files based on memory row information and memory column information of the first operation command; and merge partial operation results of the first operation command with the first vector register file.

13. The memory device of claim 1, wherein the control circuit is configured to perform multiple operations using different partial input vectors and different weight fragments of different memory rows in the same memory bank without time corresponding to a fence between the multiple operations.

14. The memory device of claim 1, wherein the control circuit is configured to:

generate, using the ALU, a first partial operation result by performing a product operation between the first input fragment and weight values of the first weight fragment;

generate, using the ALU, a second partial operation result by performing a product operation between the second input fragment and weight values of the second weight fragment;

determine that the first operation command and the second operation command indicate a same vector register file; and store a result obtained by summing the first partial operation result and the second partial operation result in the same vector register file in response to the determination.

15. The memory device of claim 14, wherein the first partial operation result, the second partial operation result, and the summed result have the same vector form.

16. The memory device of claim 1, further comprising:

a plurality of memory banks configured to respectively store weight fragments; and a processing-in-memory (PIM) block having the first scalar register file, the second scalar register file, the ALU, and the control circuit, wherein the PIM is disposed adjacent to a corresponding memory bank among the plurality of memory banks.

17. The memory device of claim 1, wherein the memory device is implemented as one of a high bandwidth memory (HBM) device, a double data rate (DDR) device, a low-power double data rate (LPDDR) device, and a graphics double data rate (GDDR) device.

18. An operation method performed by a memory device, the operation method comprising:

loading a first input fragment from a first scalar register file and loading a first weight fragment from a memory bank based on a first operation command received from a host;

performing a first operation between the first input fragment and the first weight fragment using an arithmetic logic unit (ALU);

loading a second input fragment from a second scalar register file and loading a second weight fragment from the memory bank based on a second operation command received from the host; and performing, using the ALU, a second operation between the second input fragment and the second weight fragment, wherein multiple operations, including the first operation and the second operation, using a same partial input vector and different weight fragments of different memory rows in a same memory bank are performed without time corresponding to a fence between the multiple operations.

19. A computing system comprising:

a host configured to transmit operation commands indicating weight fragments of different memory rows in a same memory bank without time corresponding to a fence; and a memory device configured to load from a plurality of scalar register files different input fragments corresponding to the operation commands, and perform operations, using an arithmetic logic unit (ALU), between the weight fragments and the input fragments, wherein the memory device is further configured to perform multiple operations using a same partial input vector and different weight fragments of different memory rows in a same memory bank without time corresponding to a fence between the multiple operations.

20. A method of performing a processor-in-memory (PIM) operation, the method comprising:

generating a scalar register file index and a vector register file index, wherein the scalar register file index indicates a scalar register file from among a plurality of scalar register files and the vector register file index indicates a vector register file from among a plurality of vector register files;

loading an input value from the scalar register file based on the scalar register file index;

performing an operation on the input value and a weight value from a memory bank; and storing a result of the operation in the vector register file based on the vector register file index.

* * * * *